US007231175B2

(12) United States Patent
Ellis

(10) Patent No.: US 7,231,175 B2

(45) Date of Patent: Jun. 12, 2007

(54) MUSIC INFORMATION SYSTEM FOR OBTAINING INFORMATION ON A SECOND MUSIC PROGRAM WHILE A FIRST MUSIC PROGRAM IS PLAYED

(75) Inventor: Michael D Ellis, Boulder, CO (US)

(73) Assignee: United Video Properties, Inc., Los Angeles, CA (US)

( * ) Notice: Subject to any disclaimer, the term of this patent is extended or adjusted under 35 U.S.C. 154(b) by 64 days.

(21) Appl. No.: 11/032,733

(22) Filed: Jan. 10, 2005

(65) Prior Publication Data

US 2005/0227611 A1 Oct. 13, 2005

Related U.S. Application Data

(63) Continuation of application No. 09/330,860, filed on Jun. 11, 1999, now abandoned.

(60) Provisional application No. 60/089,473, filed on Jun. 16, 1998.

(51) Int. Cl.
*H04H 1/00* (2006.01)
*H04B 7/00* (2006.01)
*H04B 11/00* (2006.01)

(52) U.S. Cl. ..................... 455/3.01; 455/66.1; 455/344

(58) Field of Classification Search ............... 455/3.01, 455/3.04, 3.06, 66.1, 344
See application file for complete search history.

(56) References Cited

U.S. PATENT DOCUMENTS 4,488,179 A 12/1984 Krü ger et al.
4,706,121 A 11/1987 Young
4,887,308 A 12/1989 Dutton
5,134,719 A 7/1992 Mankovitz
5,193,009 A 3/1993 Park
5,282,028 A 1/1994 Johnson et al.
5,285,284 A 2/1994 Takashima et al.
5,303,393 A 4/1994 Noreen et al.
5,457,815 A 10/1995 Morewitz, II
5,557,338 A 9/1996 Maze et al.

(Continued)

FOREIGN PATENT DOCUMENTS

WO WO 95/06389 3/1995

(Continued)

OTHER PUBLICATIONS

"Digital Video Broadcasting (DVB); DVB specification for data broadcasting." European Telecommunications Standards Institute, Draft EN 301 192 V1.2.1 (Jan. 1999).

*Primary Examiner*—Tilahun B. Gesessse
(74) *Attorney, Agent, or Firm*—Fish & Neave IP Group of Ropes & Gray LLP; Paul E. Leblond

(57) ABSTRACT

A television and music distribution system is provided. Music programs are distributed over a number of analog and digital music channels to a number of users for playing by their user music equipment. Music information on the music program currently broadcasted on the music channels is provided in an in-band data stream on the channels. The user music equipment includes two tuners for providing users with the ability to listen to the music program on one channel while viewing the music information on another.

12 Claims, 18 Drawing Sheets

U.S. PATENT DOCUMENTS

| | | | | |
|---|---|---|---|---|
| 5,585,866 | A | | 12/1996 | Miller et al. |
| 5,589,892 | A | | 12/1996 | Knee et al. |
| 5,592,551 | A | | 1/1997 | Lett et al. |
| 5,699,125 | A | | 12/1997 | Rzeszewski et al. |
| 5,784,095 | A | | 7/1998 | Robbins et al. |
| 5,812,937 | A | * | 9/1998 | Takahisa et al. ........... 455/66.1 |
| 5,930,690 | A | | 7/1999 | Nakata |
| 6,161,002 | A | | 12/2000 | Migliaccio et al. |
| 6,192,340 | B1 | | 2/2001 | Abecassis |
| RE37,131 | E | | 4/2001 | Mankovitz |
| 6,516,466 | B1 | | 2/2003 | Jackson |

FOREIGN PATENT DOCUMENTS

| | | |
|---|---|---|
| WO | WO 93/03267 | 1/1999 |

* cited by examiner

180

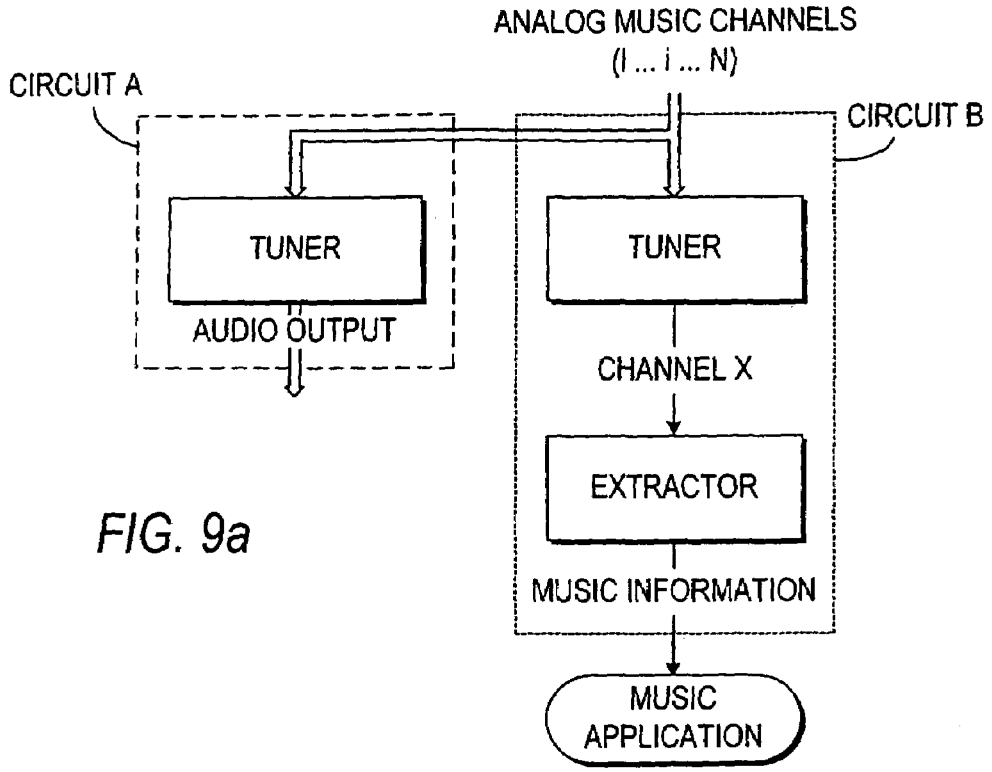
FIG. 9a
FIG. 9b
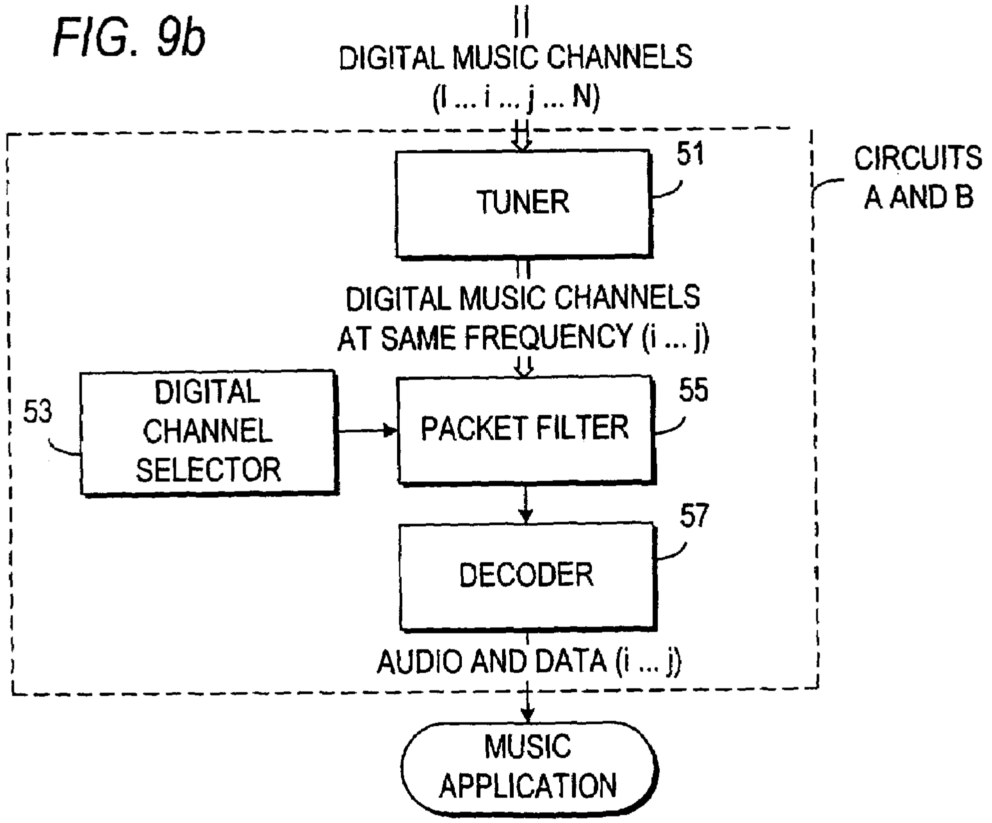

MUSIC INFORMATION SYSTEM FOR OBTAINING INFORMATION ON A SECOND MUSIC PROGRAM WHILE A FIRST MUSIC PROGRAM IS PLAYED

This application is a continuation of U.S. patent application Ser. No. 09/330,860 filed Jun. 11, 1999 now abandoned, which claims the benefit of United States provisional patent application No. 60/089,473, filed Jun. 16, 1998.

BACKGROUND OF THE INVENTION

This invention relates to interactive music information systems, and more particularly, to interactive music information systems that use two tuners for obtaining in-band data.

Cable, satellite, and broadcast television systems provide viewers with a large number of television channels. Many cable systems also provide digital and analog music channels to their customers. Music program listings and other music application data (e.g., track, title, artist information, etc.) are typically provided by a satellite uplink facility to a number of cable system headends. Each headend distributes the music application data for each music channel to a number of users as part of a data stream. Current music applications limit users to viewing in-band music information for music channels to which the user has tuned. This is because music applications have been implemented that control only a single tuner and because music program related information for each channel is carried in-band on each channel. While the user is tuned to one music channel, the music application cannot tune to another music channel to obtain in-band data and show the user music information carried by the other channel.

Interactive program guides have been developed that provide users with the ability to view music channel information that is sent out-of-band and ahead of the music programming carried on the channels. Such music channel information has included the type of music carried by each channel (e.g., rock, disco, etc.) and the channel's number and call letters, but not song titles or other song specific information. In other program guide systems, program guide data is transmitted in-band and is only available to the program guide when the program guide is tuned to a specific channel (or to one of several specific channels). The program guide typically obtains program guide data when the viewer is not watching television. The program guide may also obtain program guide data when the user is watching one of the channels that carry an in-band data stream. Some manufacturers are manufacturing home television equipment with a second agile tuner. This is primarily to support features such as picture-in-picture ("PIP"), or to allow a viewer to simultaneously watch television and access a data service such as an Internet browser.

It is therefore an object of the present invention to provide an interactive music application that provides users with the opportunity to listen to one music channel while viewing music information for another.

It is another object of the present invention to provide an interactive music application that provides users with the opportunity to simultaneously view in-band music information from a number of music channels.

SUMMARY OF THE INVENTION

These and other objects of the present invention are accomplished in accordance with the principles of the present invention by providing an interactive music application system in which two tuners are used to tune to channels and obtain in-band data. A main facility distributes music information to a number of distribution facilities. Each distribution facility distributes the music information to a number of users for display on their user music equipment. The interactive music application may be implemented wholly on the user's music equipment, or partially on the user's music equipment and partially on a server at the distribution facility. In addition, the music application may obtain music information from a Web server using any suitable Internet-based approach.

The distribution facilities may provide users with one or more analog or digital music channels. Each music channel may include an in-band data stream that contains the music information received from the main facility. The music information may include, for example, track information, title information, artist information, graphics, web links, ordering information or other information related to the music programming carried on the music channel. While a user is tuned to a first music channel, the music application may obtain music information from that channel using the tuner that is tuned to that channel. When a user indicates a desire to view music information for a channel other than the one to which the first tuner is tuned, the music application directs a second tuner to tune to the other music channel and obtains the in-band music information from that channel.

The music application may provide a user with an opportunity to simultaneously view music information for a number of analog and digital music channels. When the user indicates a desire to view music information, the music application directs a tuner to sequentially tune to each music channel so that the music application may obtain in-band music information from each of those channels.

Further features of the invention, its nature and various advantages will be more apparent from the accompanying drawings and the following detailed description of the preferred embodiments.

BRIEF DESCRIPTION OF THE DRAWINGS

FIGS. 9*a*, 9*b*, and 9*c* show illustrative circuits of user music equipment 22 that may be used to simultaneously obtain music programs and in-band music information from different music channels.

DETAILED DESCRIPTION OF THE PREFERRED EMBODIMENTS

Figure 1:
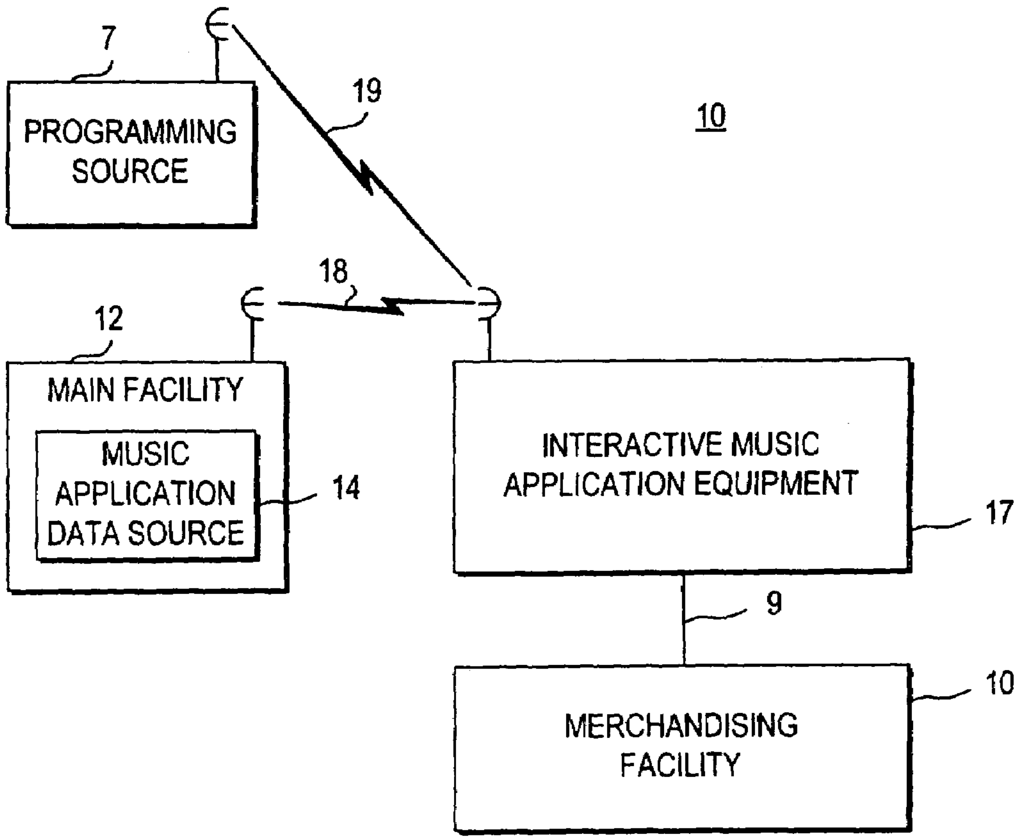
FIG. 1 is a schematic block diagram of an illustrative system in accordance with the present invention.

An illustrative system 10 in accordance with the present invention is shown in FIG. 1. Main facility 12 provides music information from music application data source 14 to interactive music application equipment 17 via communications link 18. There are preferably numerous pieces or installations of interactive music application equipment 17, although only one is shown in FIG. 1 to avoid overcomplicating the drawing.

Link 18 may be a satellite link, a telephone network link, a cable or fiber optic link, a microwave link, an Internet link, a combination of such links, or any other suitable communications link. If it is desired to transmit video signals over link 18 in addition to data signals, a relatively high bandwidth link such as a satellite link may generally be preferred to a relatively low bandwidth link such as a telephone line.

The music information transmitted by main facility 12 to interactive music application equipment 17 may include information related to music programs such as track information, title information, artist information, graphics, web links, or any other information related to the music programming carried on the channel.

An interactive music application is implemented on interactive music application equipment 17. Four illustrative arrangements for interactive music application equipment 17 are shown in FIGS. 2*a*–2*d*. As shown in FIGS. 2*a*–2*d*, interactive music application equipment 17 may include distribution equipment 21 located at distribution facility 16, and user music equipment 22.

Figure 2A:
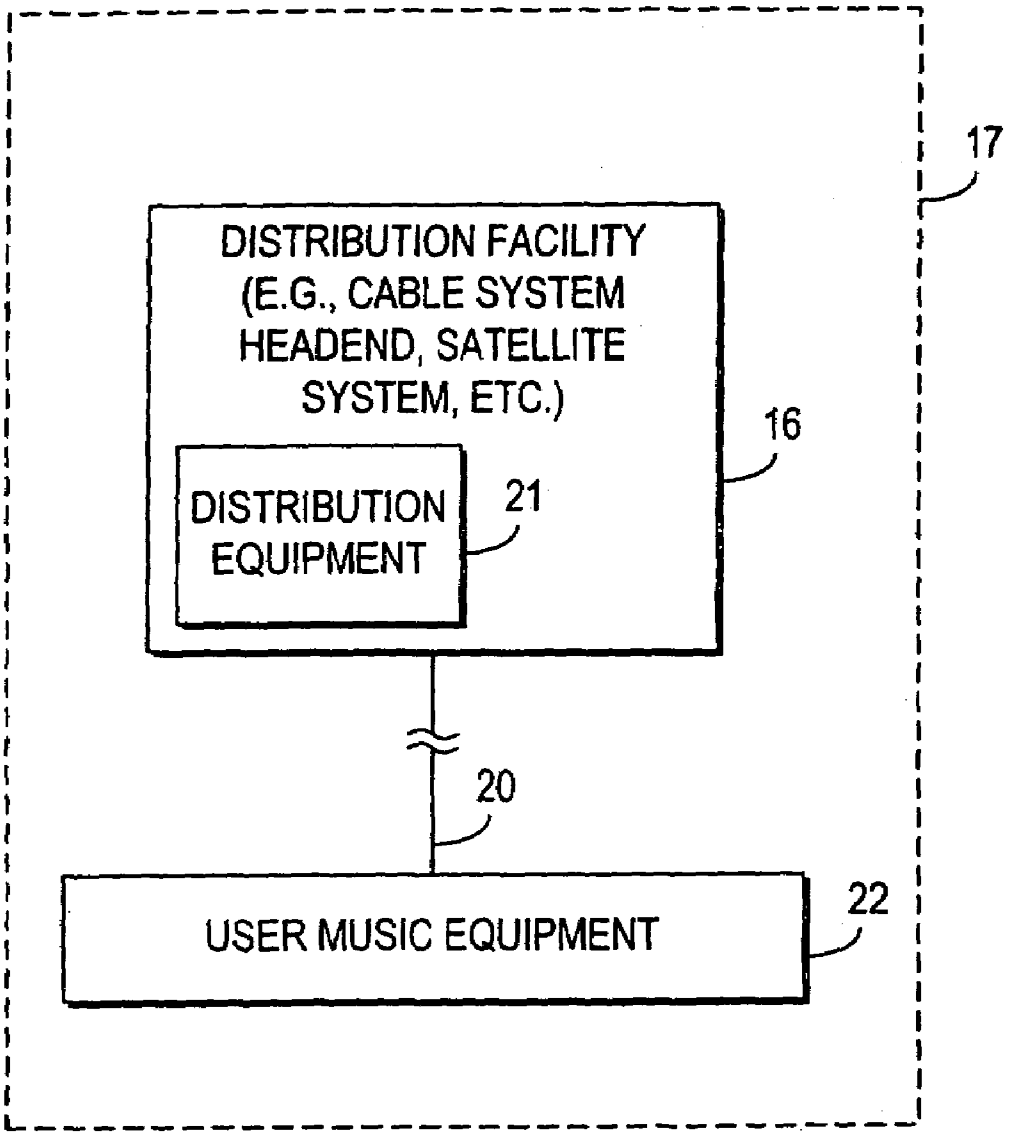
FIGS. 2*a*, 2*b*, 2*c*, and 2*d* are diagrams showing illustrative arrangements for the interactive music application equipment of FIG. 1 in accordance with the principles of the present invention.
Figure 2B:
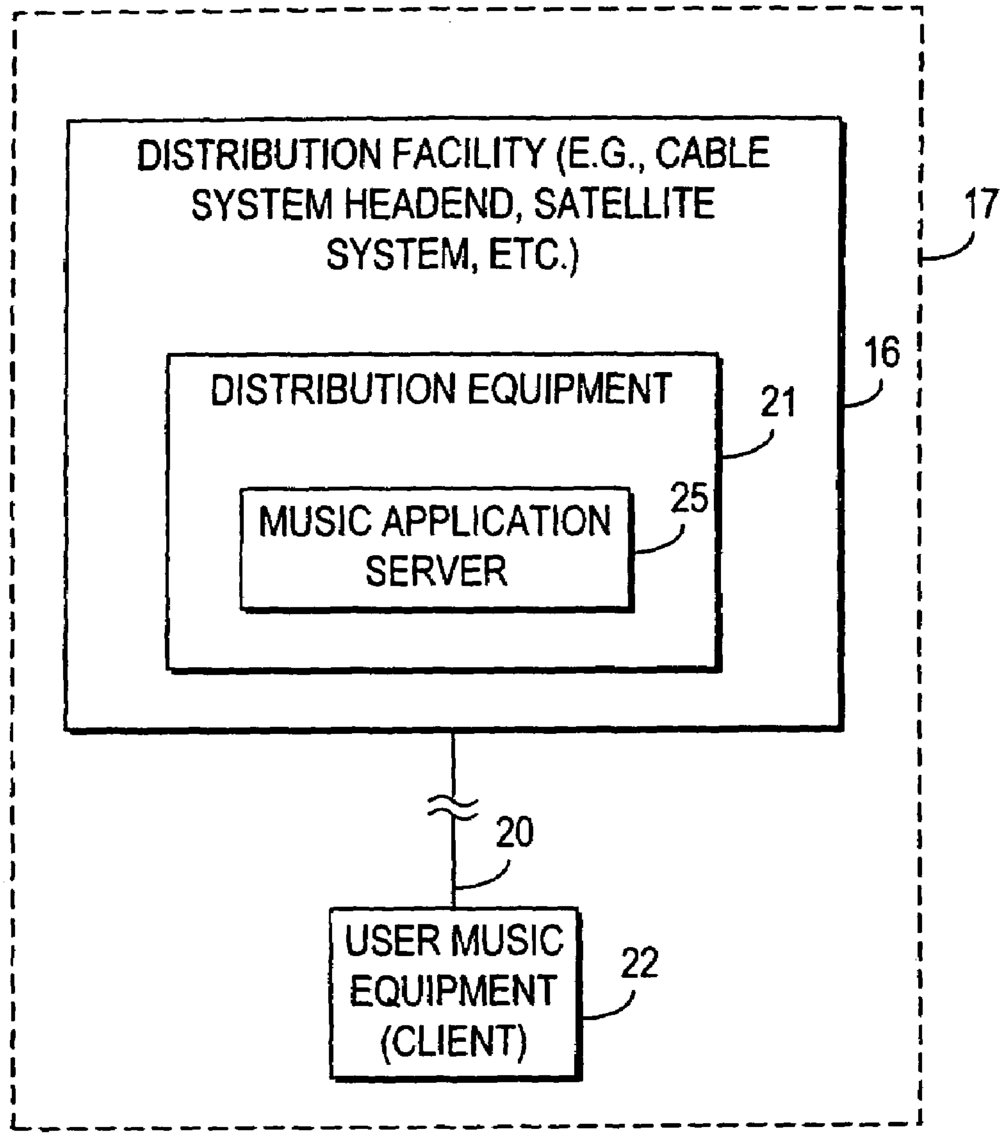
Figure 2C:
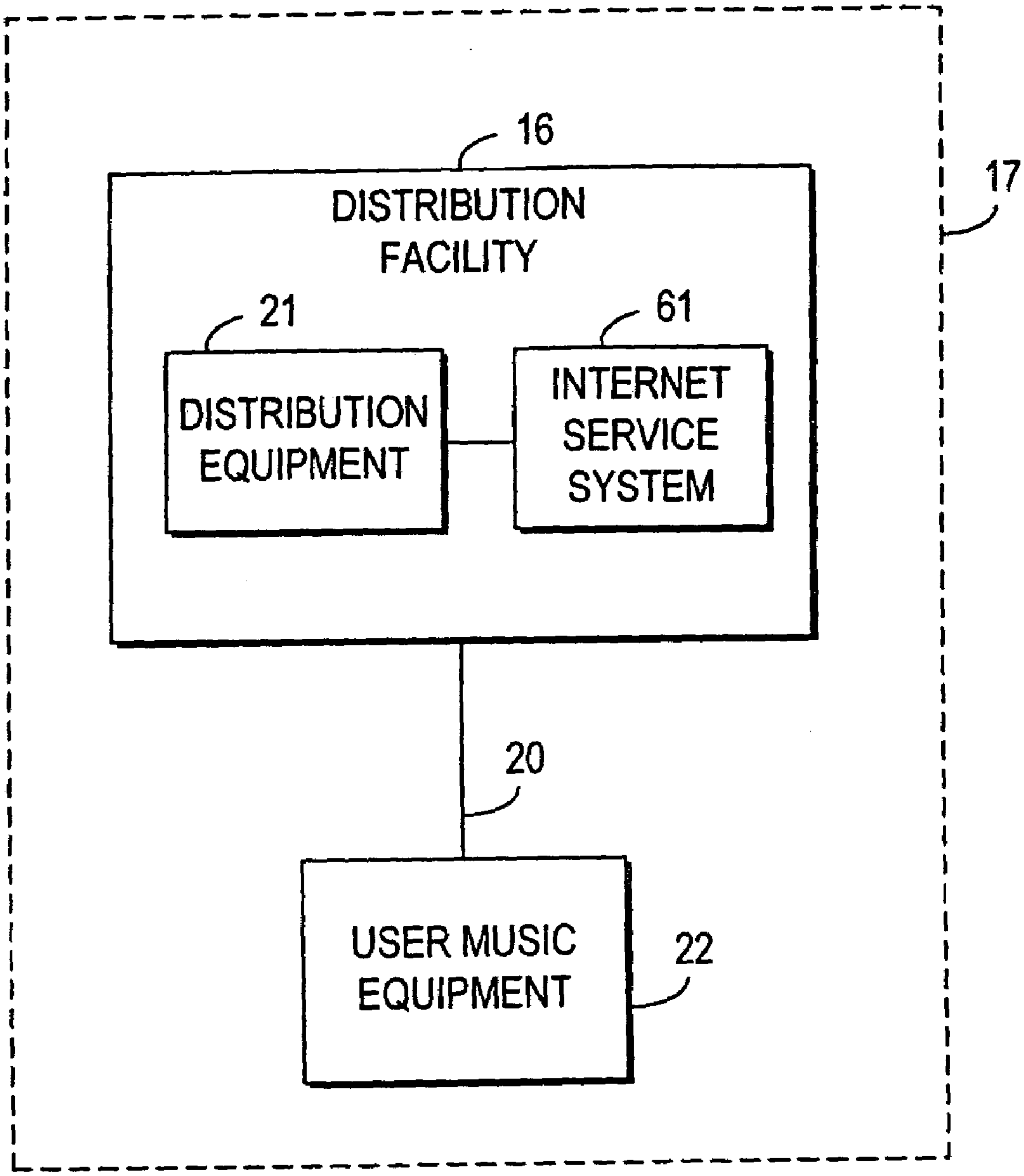
Figure 2D:
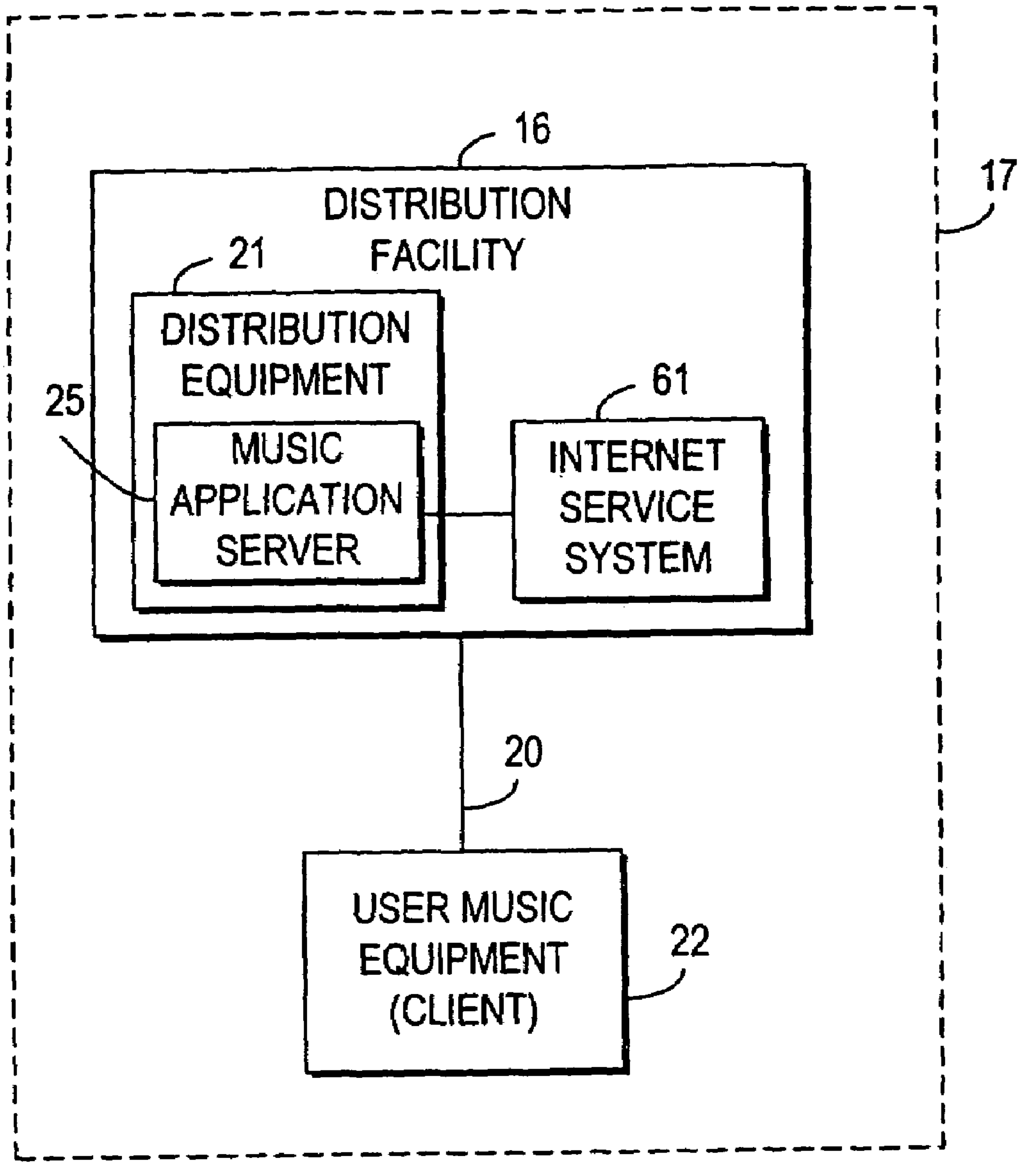

The interactive music application may run totally on user music equipment 22 as shown in FIGS. 2*a* and 2*c*, or may run partially on user music equipment 22 and partially on distribution equipment 17 using a suitable client-server or distributed processing approach as shown in FIGS. 2*b* and 2*d*. The interactive music application may be any application suitable for obtaining music information and for simultaneously displaying music information for multiple music programs. If desired, the music application may run independently alongside other applications running on user music equipment 22, or may be integrated into a suitable application such as an interactive program guide.

Distribution facility 16 may be any suitable distribution facility (e.g., a radio broadcast facility, a cable system headend, a broadcast distribution facility, a satellite distribution facility, an Internet site or any other suitable type of distribution facility). Distribution facility 16 may have distribution equipment 21. Distribution equipment 21 may distribute the music information that distribution facility 16 received from main facility 12 to multiple users via communications paths 20. In another suitable approach, main facility 12 and distribution facility 16 may be the same facility.

To the extent that the bandwidth of communications paths 20 and other environmental constraints of system 10 (e.g., the number of users in the system) may allow, distribution equipment 21 may simultaneously distribute music information for music programs currently being broadcasted and for music programs broadcasted at additional times (e.g., for programs broadcasted ten minutes before and after the current time).

Distribution equipment 21 of FIGS. 2*a* and 2*b* may be any equipment suitable for providing music information to user music equipment 22. Distribution equipment 21 may include, for example, suitable transmission hardware for distributing music information on a television channel sideband, in the vertical blanking interval of a television channel, using an in-band digital signal, using an out-of-band digital signal, or by any other suitable data transmission technique. Distribution equipment 21 may, for example, distribute music information for all music channels to user music equipment 22 over a dedicated analog or digital music channel. In another suitable approach, each music channel may carry its own music information in-band along with a subset of the music information for other music channels. In still another suitable approach, each music channel may carry an in-band data stream of the music information for all music channels. Analog or digital video signals (e.g., television programs) may also be distributed by distribution equipment 21 to user music equipment 22 over communications paths 20 on multiple television channels.

Communications paths 20 may be any communications paths suitable for distributing music information. Communications paths 20 may include, for example, a satellite link, a telephone network link, a cable or fiber optic link, a microwave link, an Internet link, a data-over-cable service interface specification (DOCSIS) link, a combination of such links, or any other suitable communications link. Communications paths 20 preferably have sufficient bandwidth to allow distribution facility 16 to distribute music programming to user music equipment 22. There are typically multiple pieces of user music equipment 22 and multiple associated communications paths 20, although only one piece of user music equipment 22 and communications path 20 are shown in FIGS. 2*a*–2*d* to avoid overcomplicating the drawings. If desired, television programming may be provided over separate communications paths (not shown).

FIG. 2*b* shows an illustrative arrangement for interactive music application equipment 17 in a client-server based or distributed interactive music application system. As shown in FIG. 2*b*, distribution equipment 21 may include music application server 25. Music application server 25 may be any suitable software and hardware for providing a client-server based music application. Music application server 25 may run a suitable database engine such as a SQL Server by Microsoft. Music application server 25 provides music information in response to queries generated by a music application client implemented on user music equipment 22. If desired, music application server 25 may be located at main facility 12 or another location (not shown).

FIGS. 2*c* and 2*d* show illustrative web-based interactive music application systems. Distribution facility 16 may, for example, include Internet service system 61 on which a web site may be maintained. Internet service system 61 may be based on any combination of hardware and software capable of providing a web site. If desired, Internet service system 61 may be located at a facility that is separate from distribution facility 16.

If the music application is implemented on user music equipment 22 of interactive music application equipment 17 as shown in FIG. 2*c*, Internet service system 61 (or other suitable equipment at distribution facility 16 that is connected to Internet service system 61) may provide music information to user music equipment 22 via distribution equipment 21 using any suitable Internet-based approach (e.g., using the HyperText Transfer Protocol (HTTP) over a Transmission Control Protocol/Internet Protocol (TCP/IP) type link). If the music application implemented on interactive music application equipment 17 is a client-server application as shown in FIG. 2*d*, Internet service system 61 may interact with music application server 25 when providing music information to user music equipment 22. The music application may also, however, obtain music information from Internet service system 61 via an Internet connection made through a third-party Internet Service Provider. Music programming may also be provided by Internet service system 61 to user music equipment 22.

If desired, distribution equipment 21 may include suitable hardware (not shown) on which a first portion or version of the interactive music application is implemented. A second portion or version of the music application may be implemented on user music equipment 22. The two versions or portions of the interactive music application may communicate using a suitable peer-to-peer communications scheme (e.g., messaging, remote procedure calls, etc.) and may share tasks associated with implementing interactive music application functions.

If desired, distribution facility 16 may also supply music programming to user music equipment 22 in response to demands made by the user using user music equipment 22. Any suitable audio-on-demand (AOD) or near audio-on-demand (NAOD) approach may be used.

For clarity, the present invention will be illustrated in connection with a system arrangement in which music information is distributed from a main facility to an interactive music application implemented on user music equipment via a distribution facility. Other suitable systems involve arrangements in which data is distributed to a music application on user music equipment using other suitable distribution schemes, such as schemes involving data transmission over the Internet or the like (as shown in FIGS. 2*c* and 2*d*). If desired, the interactive music application may be implemented using a client-server architecture in which the primary processing power for the application is provided by a server (e.g., music application server 25) located at, for example, the distribution facility or the main facility, and user music equipment 22 acts as a client processor, as in, for example, the system shown in FIGS. 2*b* and 2*d*. A suitable distributed approach may also be used.

Television programming may also be distributed by distribution facility 16 to user music equipment 22. The programming may be transmitted on analog or digital television channels that may include in-band data. Analog and digital music channels may, for example, include in-band data streams that contain music information such as track information, title information, artist information, graphics, web links, ordering information, or any other information related to the music programming carried on the channel.

Programming (e.g., music programs) and programmer-provided in-band data may be provided by programming source 7 to distribution facilities 16 over communications link 19 and then redistributed by distribution equipment 21 to users over communications paths 20. If desired, programming source 7 and distribution facility 16 may be the same facility. Programming and in-band data may also be provided from programming source 7 to user music equipment 22 directly using, for example, a suitable digital satellite service and communications path (not shown). There may be multiple programming sources 7 but only one has been shown to avoid overcomplicating the drawing. In still another suitable approach, music programs may be provided by programming source 7 to Internet service system 61 for distribution to user music equipment 22 via the Internet.

Digital music programming and data may be distributed using any suitable approach. In one suitable approach, multiple digital channels are provided to users on a single analog "channel". That is, multiple digital programming streams may be multiplexed and transmitted at a single carrier frequency. Each digital channel may include, for example, a number of tracks. Tracks may include, for example, video tracks, audio tracks, and data or other suitable tracks. Digital music channels, for example, have no video track but have an audio track and a data track that may carry music information. The information in each track is transmitted in packets on the digital television channel. The packets also contain packet identifiers ("PIDs") identifying the track that each packet belongs to. A PID map that indicates which PIDs correspond to which digital channels may also be transmitted in-band. User music equipment 22 may include suitable hardware and software for tuning to the carrier frequency and selecting a desired digital channel.

Figure 3:
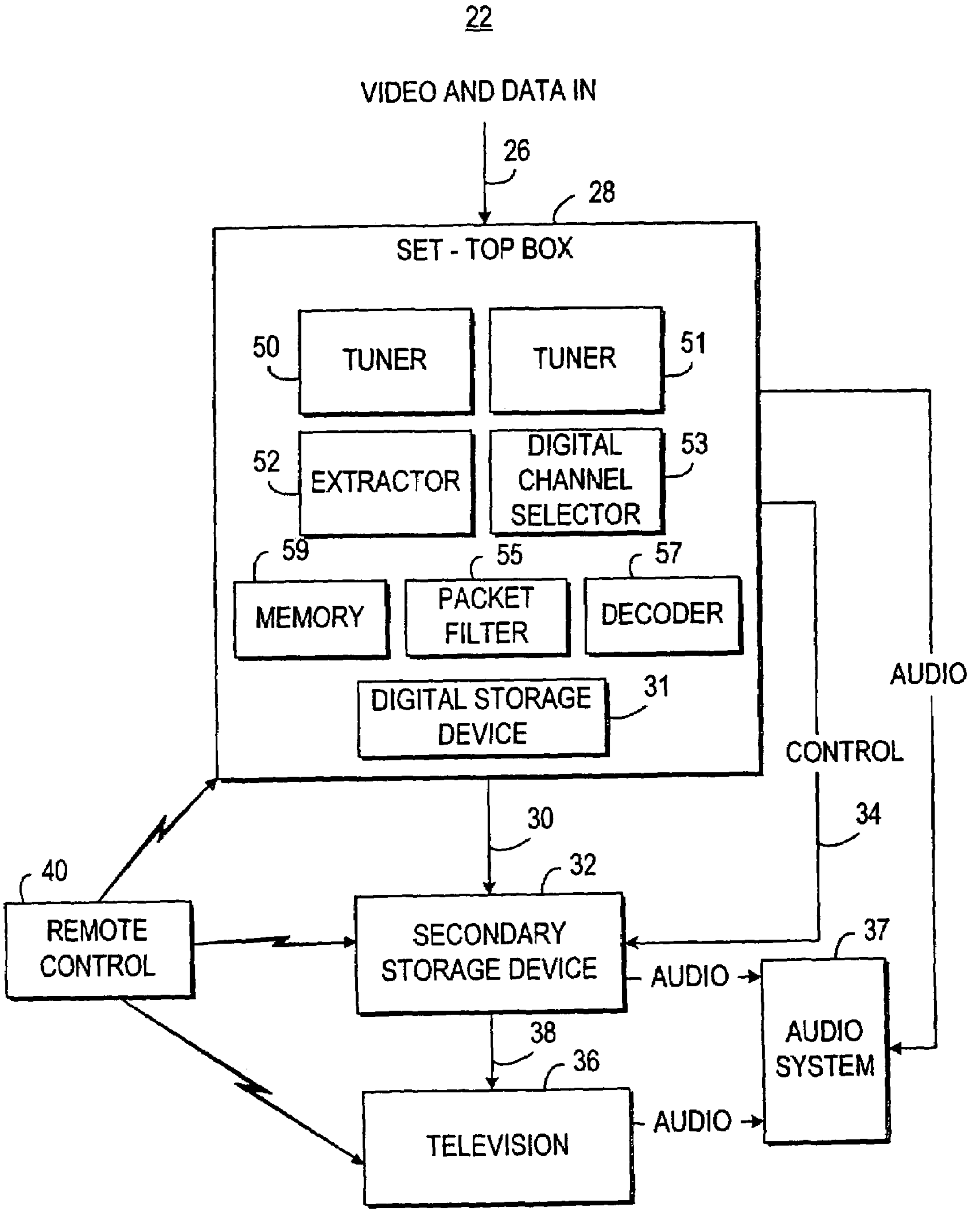
FIG. 3 is an illustrative schematic block diagram of the user music equipment of FIGS. 2*a*, 2*b*, 2*c*, and 2*d* in accordance with the principles of the present invention.

An illustrative arrangement for user music equipment 22 and the devices it may include is shown in FIG. 3. User music equipment 22 of FIG. 3 may receive video, audio and data from distribution facility 16 (FIG. 1) at input 26. During normal television viewing, tuner 50 of set-top box 28 may be tuned to a desired television channel based on inputs from the user on remote control 40. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard). The video signal at output 30 is received by optional secondary storage device 32.

User music equipment 22 may also have a second tuner, tuner 51, that is controlled at least in part by the interactive music application for obtaining in-band data. Tuner 51 may be any suitable tuner for tuning to an analog carrier. If communicate path 20 includes, for example, a DOCSIS link, tuner 51 may have suitable cable-modem-like circuitry for obtaining music information from an Internet source. FIG. 3 shows several components as being part of set-top box 28, but such components may be integrated into different hardware in user music equipment 22 if desired. Set top box 28 may also have extractor 52. Extractor 52 may be any hardware, software, or combination thereof suitable for extracting in-band data from an analog channel (e.g., a vertical blanking interval (VBI) extractor).

Set-top box 28 may also have digital channel selector 53, packet filter 55, and decoder 57 (or any suitable combination of such components) for obtaining the tracks of a particular digital channel from the signals that have been tuned to by tuners 50 and 51. Set-top box 28 may also have memory 59 for storing the PID map and for temporarily storing in-band information obtained by the music application using a second tuner. Digital channel selector 53 may obtain the PID map from the in-band data stream, store it in memory 59, and may determine which PIDs correspond to which digital channels. If desired, the PID map may be preprogrammed into memory 59 of the music application. In another suitable approach, the music application may obtain the PID map from the out-of-band data stream.

The PIDs for the tracks of the selected channel are passed by digital channel selector 53 or the music application to packet filter 55. PIDs for multiple channels may be passed by digital channel selector 53 to packet filter 55 when, for example, the music application requires in-band digital data for digital channels transmitted at the same carrier frequency. Packets whose PIDs do not match the PIDs for the tracks of the selected channel are filtered out by packet filter 55. The remaining packets may be passed to decoder 57 for decoding.

Audio and video tracks may be played for the user by user music equipment 22. Video (including any associated sound track) may be displayed on television 36. Pure audio may be played on television 36 or on audio system 37. Audio system 37 may receive audio signals directly from set-top box 28 (via input 39), from secondary storage device 32 (via input 41), from television 36 (via input 43), or from any other suitable path from decoder 57. Audio system 37 may be any suitable audio system such as a stereo surround sound system, etc. Data tracks may be used by the music application for obtaining in-band digital data displayed for users in music application display screens.

Secondary storage device 32 can be any suitable type of analog or digital program storage device or player (e.g., a videocassette recorder, a digital versatile disc (DVD) player, etc.). Program recording and other functions may be controlled by set-top box 28 using control path 34. If secondary storage device 32 is a videocassette recorder, for example, a typical control path 34 may involve the use of an infrared transmitter coupled to the infrared receiver in the videocassette recorder that normally accepts commands from a remote control such as remote control 40. Remote control 40 may be used to control set-top box 28, secondary storage device 32, television 36, and audio system 37.

If desired, the user may record programs and program data in digital form on optional digital storage device 31. Digital storage device 31 may be a writable optical storage device (such as a DVD player capable of handling recordable DVD discs), a magnetic storage device (such as a disk drive or digital tape), or any other digital storage device. The interactive music application may, for example, be integrated into an interactive television program guide. Interactive program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio, and data signals into a digital file format. Preferably, the file format is an open file format such as the Motion Pictures Expert Group (MPEG) MPEG-2 standard. The resulting data is provided to digital storage device 31 via an appropriate bus (e.g., a bus using the Institute Electrical and Electronics Engineers (IEEE) 1394 standard), and is stored on digital storage device 31.

Television 36 receives video and audio signals from secondary storage device 32 via communications path 38. The signals on communications path 38 may either be generated by secondary storage device 32 when playing back a prerecorded storage medium (e.g., a videocassette or a recordable digital versatile disc), by digital storage device 31 when playing back a pre-recorded digital medium, may be passed through from set-top box 28, may be provided directly to television 36 from set-top box 28 if secondary storage device 32 is not included in user music equipment 22, or may be received directly by television 36. During normal television viewing, the signals provided to television 36 correspond to the desired channel to which the user has tuned with set-top box 28. The signals may also be provided to television 36 by set-top box 28 when set-top box 28 is used to play back information stored on digital storage device 31.

The interactive music application (or music application client) may run on set-top box 28, on television 36 (if television 36 has suitable processing circuitry and memory), on audio system 37 (if audio system 37 has suitable processing circuitry and memory), or on a suitable analog or digital receiver connected to television 36 or audio system 37. In one suitable approach, audio system 37 may have suitable processing circuitry to receive music programs and music information and play the programs while displaying the information on television 36 or another display device.

The interactive music application may also run cooperatively on both television 36 or audio system 37 and set-top box 28. The music application may, for example, be integrated into a cooperative interactive television program guide application. Interactive application systems in which a cooperative interactive program guide application runs on multiple devices are described, for example, in Ellis U.S. patent application Ser. No. 09/186,598, filed Nov. 5, 1998, which is hereby incorporated by reference herein in its entirety.

Figure 4:
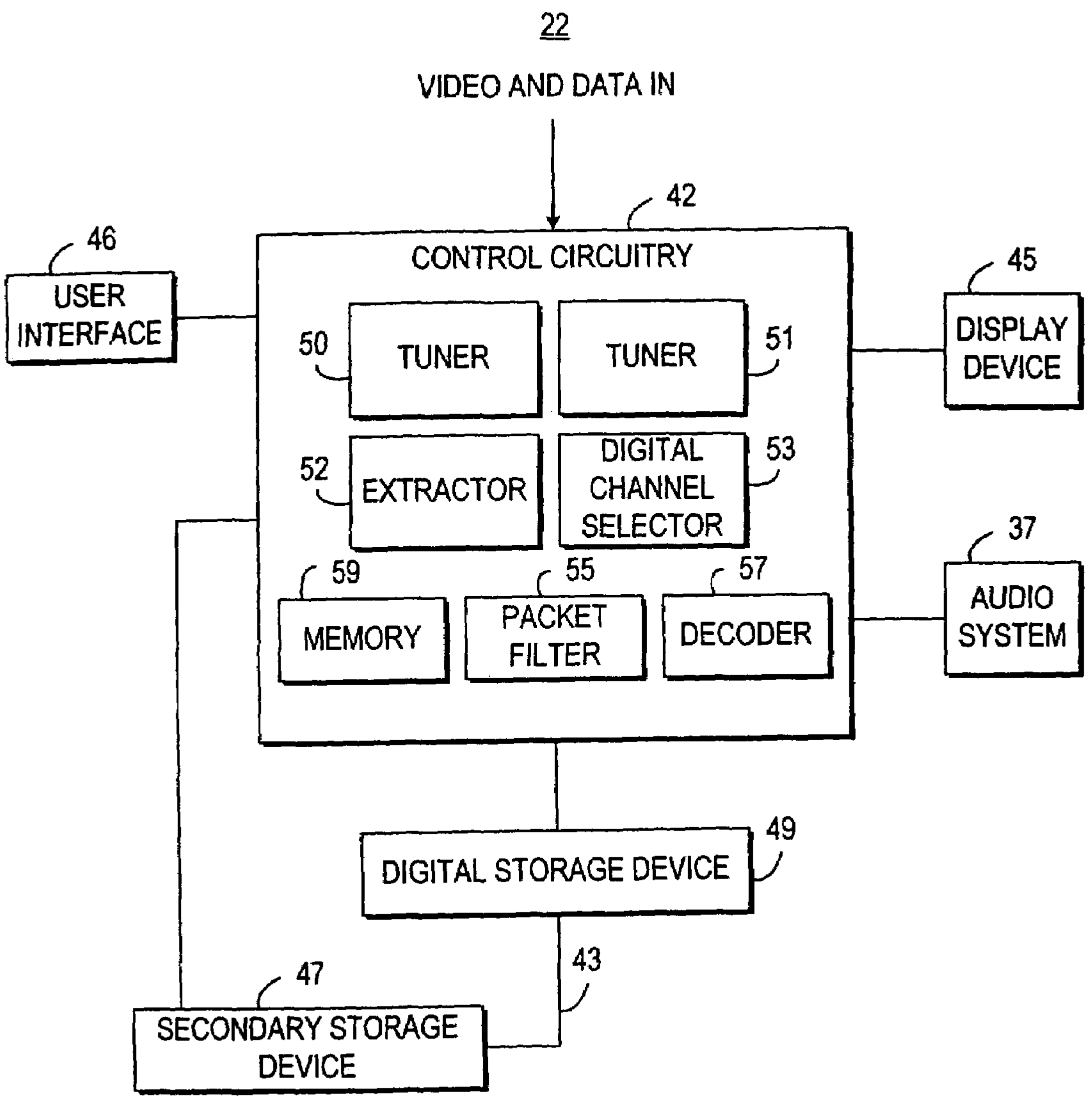
FIG. 4 is a generalized schematic block diagram of portions of the illustrative user music equipment of FIG. 3 in accordance with the principles of the present invention.

A more generalized embodiment of user music equipment 22 of FIG. 3 is shown in FIG. 4. Music information and programming from distribution facility 16 (FIG. 1) are received by control circuitry 42 of user music equipment 22. Control circuitry 42 may include circuitry suitable for tuning to digital or analog television signals as indicated by tuners 50 and 51. This may include, for example, cable-modem circuitry for obtaining music information from an Internet source over a DOCSIS link. Control circuitry 42 may also include circuitry suitable for extracting in-band data from an analog channel, as is indicated by extractor 52. Control circuitry 42 may also include circuitry suitable for selecting different digital channels, as indicated by digital channel selector 53 and packet filter 55. Decoding circuitry for decoding digital signals may also be included, as is indicated by decoder 57. Control circuitry 42 may also have memory 59 for storing the PID map and for temporarily storing in-band information obtained by the music application using a second tuner. The functions of control circuitry 42 may be provided using the set-top box arrangement of FIG. 3. Alternatively, these functions may be integrated into an advanced television receiver such as a high-definition television (HDTV) receiver, personal computer television (PC/TV), digital or analog radio receiver, or any other such suitable component or combination of components.

User music equipment 22 of FIG. 4 may have secondary storage device 47 and digital storage device 49 for recording programming. Secondary storage device 47 can be any suitable type of analog or digital program storage device (e.g., a videocassette recorder, a DVD, etc.). Program recording and other functions may be controlled by control circuitry 42. Digital storage device 49 can be, for example, a writable optical storage device (such as a DVD player capable of handling recordable DVD discs), a magnetic storage device (such as a disk drive or digital tape), or any other digital storage device. User music equipment 22 may also have optional audio system 37 for outputting audio. Audio system 37 may be any suitable audio output circuitry, and may include filters, amplifiers, speakers, or any other necessary hardware.

The user controls the operation of user music equipment 22 with user interface 46. User interface 46 may be a pointing device, wireless remote control, keyboard, dedicated set of buttons, touch-pad, voice recognition system, or any other suitable user input device. To listen to music, the user instructs control circuitry 42 to tune to an analog or digital music channel and to play the music program on speakers in display device 45 (not shown) or on optional audio system 37. To watch television, the user instructs control circuitry 42 to display a desired television channel on display device 45. To access the functions of the music application, the user instructs the music application implemented on interactive music application equipment 17 to generate a main menu or other desired music application display screen for display on display device 45. Display device 45 may be a television, a monitor, a liquid crystal display (LCD) on remote control 40, or any other such suitable display device.

The interactive music application may provide a user with an opportunity to listen to music programming on one music channel while viewing in-band music information for the music programming of another music channel. When a user indicates a desire to access an analog or digital music channel (e.g., by using remote control 40 to flip to or tune directly to the channel), tuner 50 may tune to the carrier frequency of the channel. For digital channels, digital channel selector 53 may obtain the PID map and may provide packet filter 55 with the PIDs of the desired digital channel. Alternatively, the music application may pass the PIDs of the desired digital channel to packet filter 55.

Figure 5A:
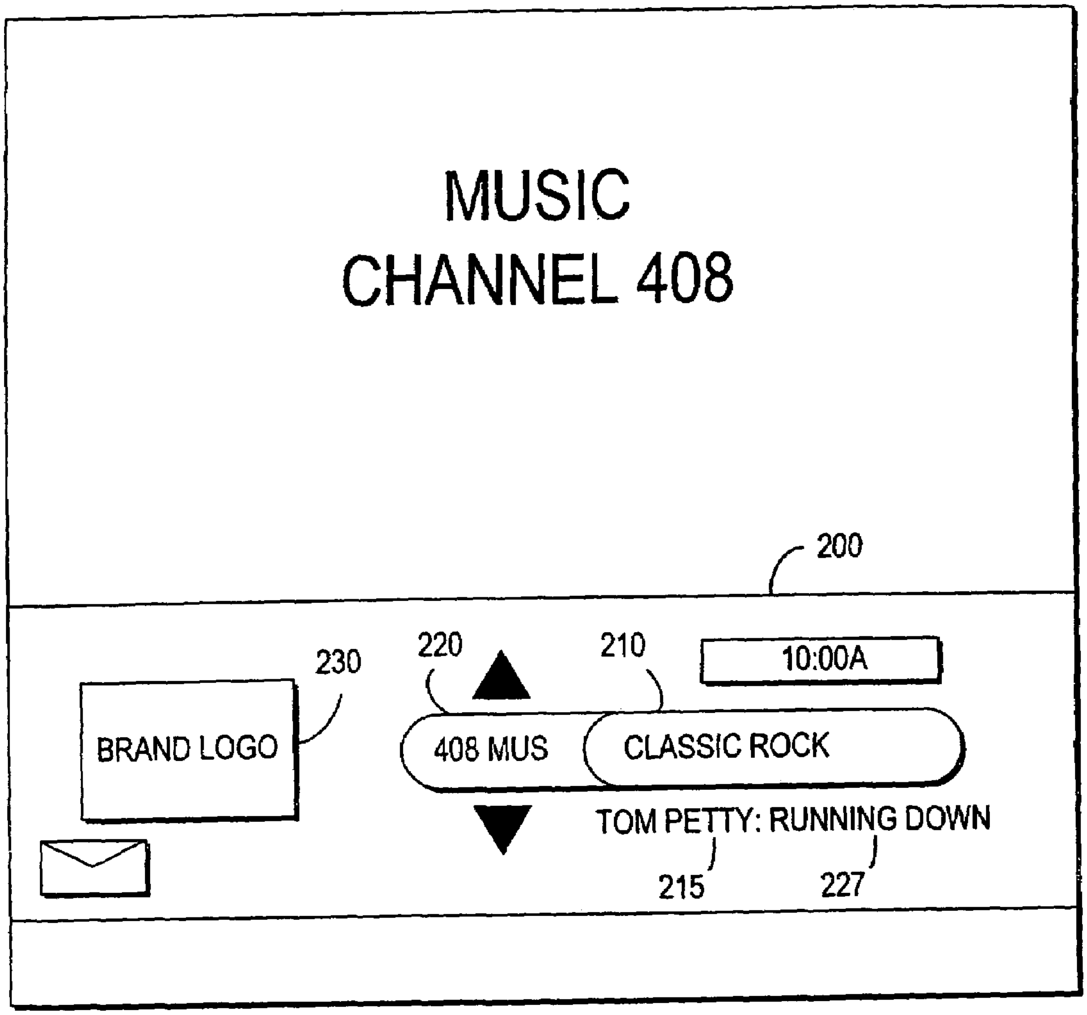
FIG. 5*a* shows an illustrative FLIP display that the music application may display when a user changes channels to an analog or digital music channel.

The interactive music application may allow the user to view music information by, for example, displaying a "FLIP" or "BROWSE" display. FIG. 5*a* shows an illustrative FLIP display 200 that the music application may display whenever the user changes television channels to a digital or analog music channel. The FLIP display may contain information associated with the current music programming, such as the current music channel category 210, the current channel number 220, the artist or group's name 215, and the current music program's title 227. The FLIP display may also include a number of graphics, such as brand logo 230, a sponsorship graphic, a channel logo graphic, message indicator, or any other suitable graphic. The user may activate the FLIP display for example by pressing an "up" or "down" key on remote control 40. Each time the user further presses one of the "up" or "down" keys, the channel to which set-top box 28 is tuned changes to the next channel, and the channel number 22 on the FLIP display changes in synchronization.

Figure 5B:
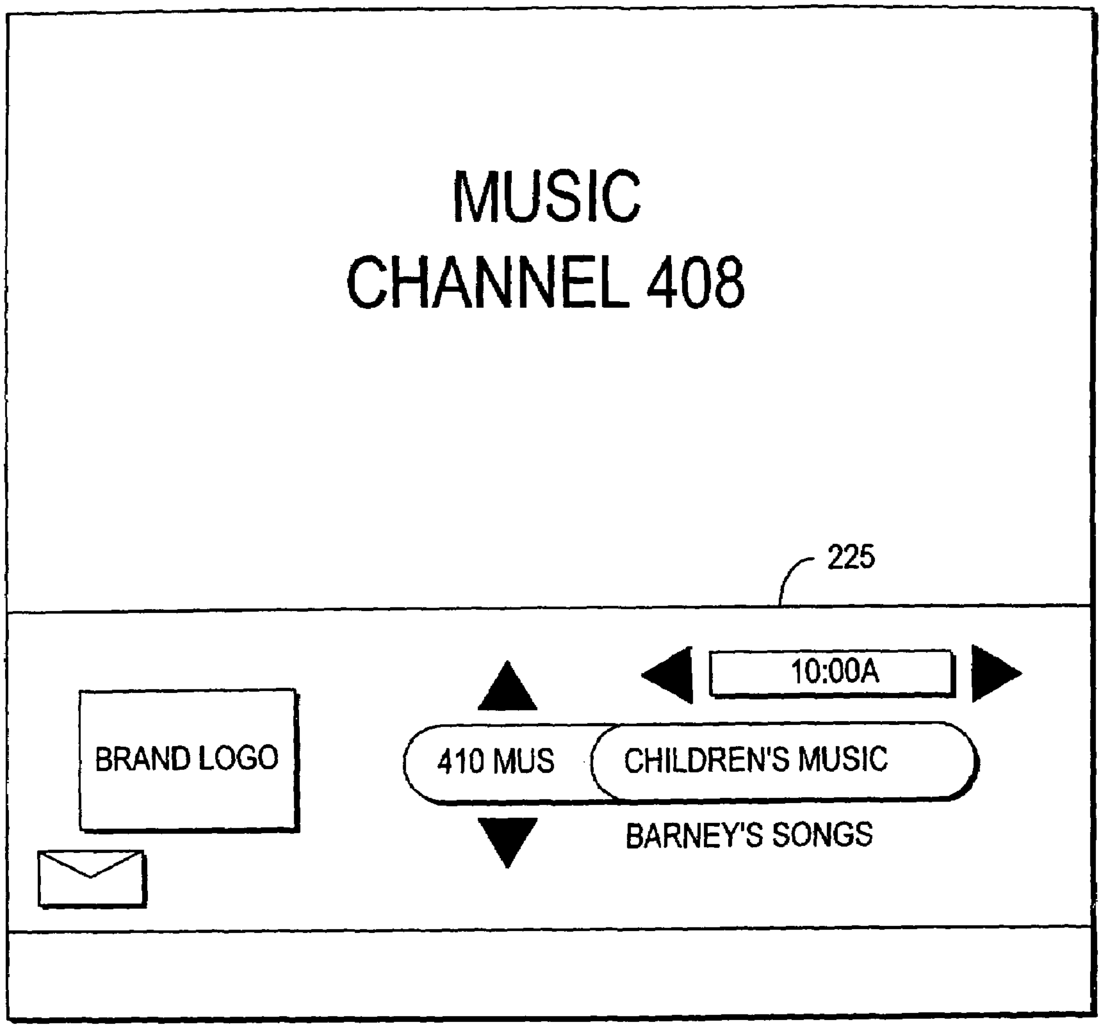
FIG. 5*b* shows an illustrative BROWSE display that the music application may display when a user indicates a desire to browse through music program listings.

FIG. 5*b* shows an illustrative "BROWSE" display 225 that the music application may display when the user opts to browse through music program listings for the current time slot. Like FLIP display 200 of FIG. 5*a*, BROWSE display 225 may display both music channel information (i.e., the type of music carried on a channel) and music information (i.e., track, title, artist, etc.). The user may activate the BROWSE display and may browse through music program listings by, for example, using remote control arrow keys. If music information for past or future music programs is available, the user may use "left" and "right" arrow keys to access information for past and future time slots. Otherwise the user generally uses the up and down arrow keys to view music information for music programs on other channels. Unlike the FLIP display, the BROWSE display allows the user to continue to listen to music on a particular channel (e.g., channel 408) while browsing for information on songs that are playing on other channels. In FIG. 5*b*. for example, the user has pressed the up arrow twice and is viewing the music information on channel 410 while listening to the music program on channel 408. In addition, the music application may tune to the browsed program in response to the user indicating a desire to do so (e.g., by pressing an "OK" key on remote control 40).

As a user browses through music program listings, the music application instructs tuner 51 to tune to the browsed music channel so that music information on the music program that is being played on the browsed channel may be extracted for display in the BROWSE display. When the user browses through analog music channels, for example, the music application may direct tuner 51 to tune to each browsed music channel while tuner 50 remains tuned to the channel that the user is listening to. If music information is carried in-band on a dedicated channel, the music application may direct tuner 51 to tune to that channel. In still another suitable approach, the music information that is displayed in BROWSE display 225 for all channels may be carried on each channel. In this approach, the music application may obtain all necessary music information using tuner 50. In each approach, extractor 52 may extract the in-band music information from each channel or channels for display by the music application.

When the browsed channel is a digital music channel at the same carrier frequency as the current channel, tuner 51 remains at the same frequency and digital channel selector 53 may provide packet filter 55 with the PIDs for the browsed digital channel. When the desired channel for the BROWSE display is a digital music channel at a carrier frequency other than that of the current channel, the interactive music application directs tuner 51 to tune to the carrier frequency of the browsed channel and digital component selector 53 (or the interactive music application) provides packet filter 55 with the PIDs for the browsed digital channel. In either case, the interactive music application extracts music information from the in-band data associated with the browsed channel and displays it in BROWSE display 225. In the example of FIG. 5*b*, the user has twice depressed the up arrow key, which has directed the music application to tune the tuner for the BROWSE display to channel 410 and to extract the song information for that song for display in display 225.

The FLIP and BROWSE displays of FIGS. 5*a* and 5*b* have been shown as including a brand logo displayed at the left of the overlay. The logo may also, for example, promote different sponsors as the user browses program listings or flips between channels. The logos may change within the same overlay or banner if the user displays the overlay or banner for a predefined time. The logo may, for example, automatically rotate through a list of logo advertisements, returning to the first advertisement after each advertisement in the list has been displayed. The brand logo may also be replaced by a text based advertisement.

The in-band data stream carried on analog and digital music channels may include graphics of, for example, the cover of the album on which a music program is published, a picture of the artist or band, etc. If desired, the music application may display a graphic after tuner 50 has tuned to the music channel. FLIP and BROWSE displays 200 and 225 may be overlaid on top of the graphic. The music application may display the graphics for other music channels as the user browses through them. Alternatively, the music application may continue to display the graphic for the channel that the user is listening to. If the music application is an interactive television program guide (or part of one), FLIP and BROWSE displays 200 and 225 may display television channel related information when the user FLIPS or BROWSES through television programs and listings, and may display music information when the user FLIPS or BROWSES through music programs and listings.

The music application may provide the user with an opportunity to access music information from, for example, a music application menu. When a user indicates a desire to access the music application (e.g., by using a "menu" key on remote control 40), the music application may generate a main menu screen, such as illustrative main menu screen 100 of FIG. 6, that provides the user with access to various music application functions. Main menu screens may also contain various advertisements, logos, etc.

Figure 6:
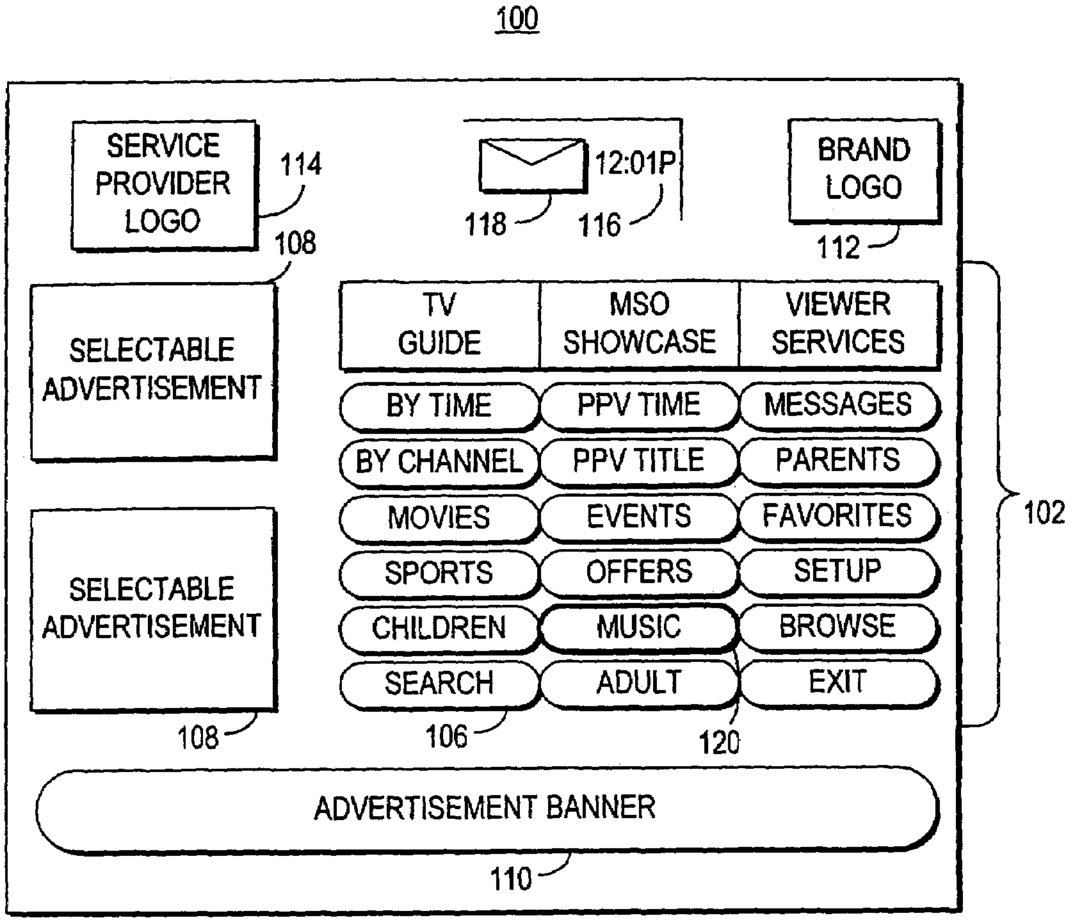
FIG. 6 shows an illustrative main menu screen that the music application may display for providing a user with access to a number of music application features.

An illustrative main menu screen 100 is shown in FIG. 6. Main menu screen 100 is illustrative of a menu screen that may be displayed when the interactive music application is an interactive television program guide (or part of a guide). Main menu screen 100 may include menu 102 of selectable music application options 106. If desired, the music application options 106 may be organized according to feature type. In menu 102, for example, music application options 106 have been organized into three columns. The column labeled "TV GUIDE" is for listings related features, the column labeled "MSO SHOWCASE" is for multiple service operator (MSO) related features, and the column labeled "VIEWER SERVICES" is for viewer related features. The interactive music application may generate a display screen for a particular music application feature when the user selects that feature from menu 102.

Main menu screen 100 may include one or more selectable advertisements 108. Selectable advertisements 108 may, for example, include text and graphics advertising pay-per-view programs. When the user selects a selectable advertisement 108, the music application may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the music application product may be indicated, for example, using a product brand logo graphic such as product brand logo graphic 112. The identity of the television service provider may be presented, for example, using a service provider logo graphic such as service provider logo graphic 114. The current time may be displayed in clock display region 116. Message indicator 118 may indicate to the user that a message from a cable operator is available.

The interactive music application may provide the user with an opportunity to view music information for current music programming. A user may indicate a desire to view music information by, for example, positioning highlight region 120 over the "Music" music application option or a similar option on another music application display screen. Alternatively, the music application may display music information when the user presses a suitable key (e.g., a "Music" key) on remote control 40 while watching a television program, listening to a music channel, browsing through listings, or when performing any other suitable user activity. In response, the music application may generate an appropriate music program listings screen for display on display device 45. A music program listings screen may contain one or more groups or lists of listings of music information organized according to one or more organization criteria (e.g., by channel, by favorites, by music program category such as country, children's music, rock, classical, etc.).

A music program listings screen may be overlaid over the graphics for a program that the user is listening to or a television program that the user is watching. When a user indicates a desire to view music program listings, the music application may direct tuner 50 to remain tuned to the music channel that was previously selected and allow its audio to be played for the user. Alternatively, the music application may direct tuner 50 to tune to the most recently tuned to music channel and allow its audio to be played for the user. In still another approach, the music application may tune to the first music channel displayed in the music program listings screen and allow its audio to be played for the user.

After the user indicates a desire to view music program listings, the music application may direct tuner 51 to sequentially tune to each analog and digital music channel if music information is carried in-band on each channel. If music information is carried on a single dedicated channel, the music application may direct tuner 51 to that channel. If a subset of music information is carried for all music channels on every music channel, the music application may obtain music information for display in a music program listings screen using only tuner 50. The music application may store the information in memory 59.

For each digital music channel, the music application directs tuner 51 to tune to the carrier frequency of each group of digital music channels. Digital component selector 53 (or the music application) provides packet filter 55 with the PIDs of each music channel at that carrier frequency, and the music application obtains music information from each of the corresponding in-band data streams and stores the information in memory 59. Alternatively, digital component selector 53 (or the music application) may provide packet filter 55 with the PIDs of each of the data tracks of the music channels at the carrier frequency to which tuner 51 is tuned at one time.

The music application may obtain music information for all music channels when the user indicates a desire to view music program listings. Alternatively, the music application may obtain music information for certain groups or pages of music channels when the user pages through a list of music program listings. In addition, the music application may direct tuner 51 to sequentially tune to each music channel displayed in a music program listings screen so that the music application may update the music program listings as they change.

The music application may allow the user to view listings organized by time, by channel, according to a number of music program categories, or may allow the user to search for a music listing by title. Digital music listings may be displayed using any suitable list, table, grid, or other suitable display arrangement. If desired, digital music listings display screens may include selectable advertisements, product brand logo graphics, service provider brand graphics, clocks, or any other suitable indicator or graphic.

Figure 7A:
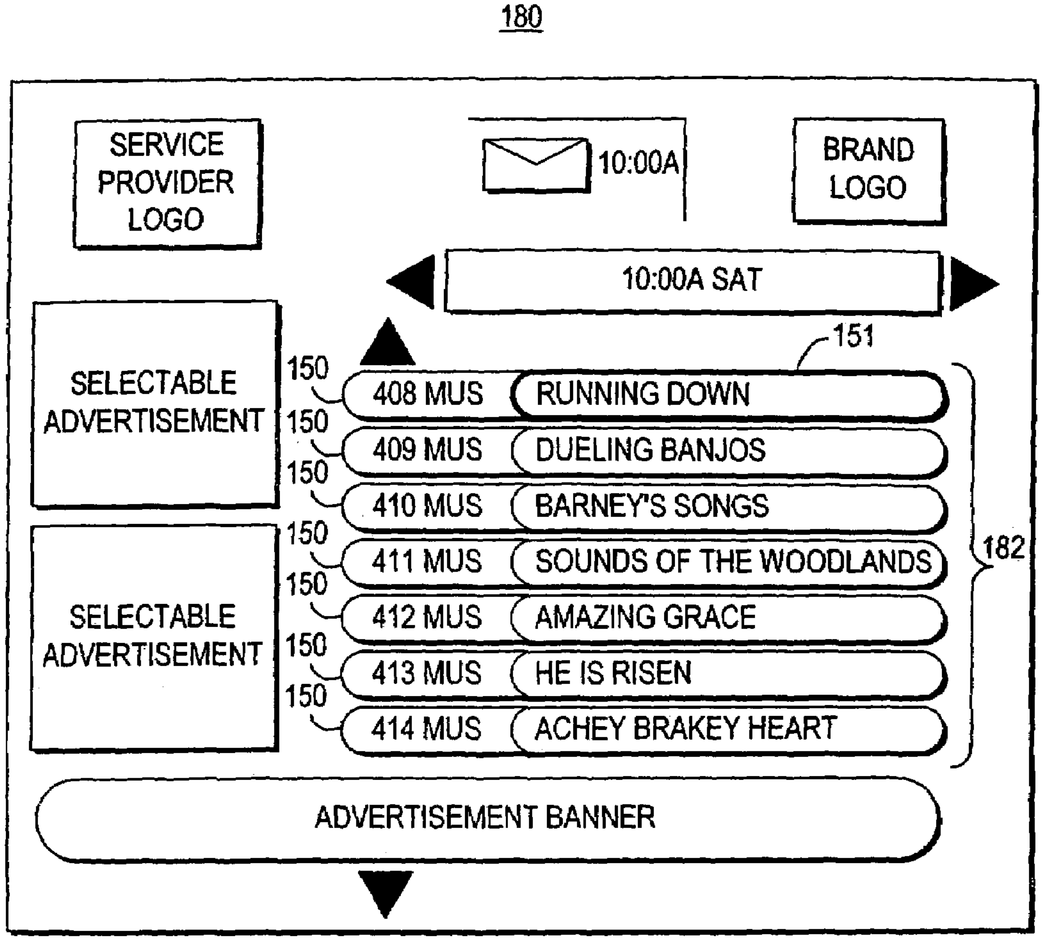
FIGS. 7*a* and 7*b* show illustrative music listings display screens that the music application may display when a user indicates a desire to view music information.

FIG. 7*a* illustrates the display of digital music listings. Music listings display screen 180 may include a highlight region 151, which highlights the current music program listing 150. The user may position highlight region 151 by entering appropriate commands with user interface device 52. For example, if user input interface device 52 includes a keypad, the user can position highlight region 151 using "up" and "down" arrow keys. Alternatively, a touch sensitive screen, trackball, voice recognition device, or other suitable device may be used to move highlight region 151 or to select music program listings without the use of highlight region 151. These methods of selecting music program listings are merely illustrative. Any other suitable approach for selecting particular music program listings may be used if desired.

The music application may also provide a user with the opportunity to page or scroll through music program listings. The user may, for example, use "page up" and "page down" arrow keys on remote control 40. As the user positions highlight region 151 over a music program listing, the music application may direct tuner 50 to tune the music channel with that music program and may play the music program for the user while continuing to display music listings display screen 180. Alternatively, the music application may direct tuner 50 to tune to a music channel in response to, for example, the user highlighting a music program listing and pressing a suitable key (e.g., an "OK" key) on remote control 40. In still another embodiment, the music application may display a pop-up window of music information for a highlighted music program listing, or may display a full screen of music program information.

After a user has selected a music program listing by, for example, highlighting the listing and pressing an "OK" key on remote control 40, the music application may also direct tuner 50 to tune to a particular music channel, display a FLIP display such as FLIP display 200 of FIG. 5*a*, and play the music program for the user. Any graphics transmitted as part of an in-band data stream may also be displayed. Alternatively, the music application may, for a predefined period of time, display a full music information screen for the music program carried on the music channel, and then display a FLIP display for the music program and any in-band graphic.

Figure 7B:
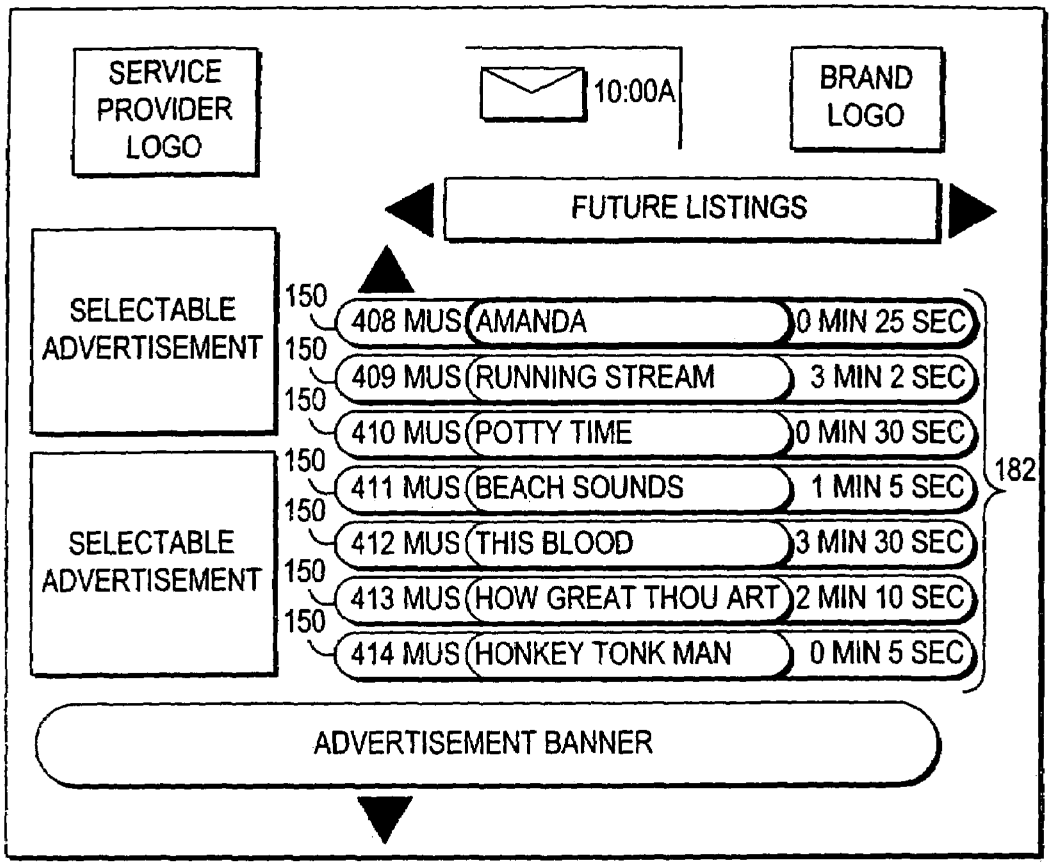

If music information for previous and upcoming music programs is also distributed, the music application may provide the user with the opportunity to navigate through listings from within music program listings screen 180. The user may navigate through listings by, for example, pressing "right" and "left" arrow keys on remote control 40. If a user navigates through listings for upcoming music programs, the music application may display a modified music program listings screen, such as that shown in FIG. 7*b*, in which the amount of time until the start of future music programs is displayed. The music application may calculate this time using any suitable approach. For example, the current time may be subtracted from the start times of the music programs. Start times of each program may be transmitted as part of the music information related to each program. If desired, the amount of time until future music programs start may also be displayed in BROWSE display 225 or any other screen in which music information is displayed.

The music application may also provide a user with the opportunity to set and navigate through favorite music channels. The user may set a music channel as a favorite by, for example, pressing a "FAV" key on remote control 40 when the user has tuned to the channel, when the user has highlighted a music program listing displayed in a music program listings screen, or from a favorites set-up screen. The user may indicate a desire to enter favorites mode by, for example, highlighting the "Favorites" option of main menu screen 100 (FIG. 6), or by pressing a "FAV" key on remote control 40 when in music listings display screen 180. In favorites mode, the music application may obtain only information for favorite music channels and may limit BROWSE display 225 (FIG. 5*b*) and music program listings screen 180 (FIG. 7*a*) to displaying music program listings for favorite music channels if desired.

In another favorites approach, BROWSE display 225 and music program listings screen 180 display listings for all music channels. When a user indicates a desire to navigate to the next favorite music channel listing by, for example, pressing a "FAV" key on remote control 40, the music application displays (as in BROWSE display 225) or highlights (as in music program listings screen 180) the next favorite music channel program listing.

The music application may also provide the user with an opportunity to view complete information about the music program played on a music channel while, for example, the user is listening to a music program, browsing through music program listings, or while in a music listings screen. The user may access the full information for a listing by, for example, pressing a designated key on remote control 40 (e.g., an "info" key), or may select an on-screen selectable graphic. Once a user has indicated a desire to view complete information about a music program, the music application may display a full music information screen, such as full music information screen 300 of FIG. 8. Because a second agile tuner may be used to gather music information for the full music information screen 300, the user need not be tuned to the same channel as the channel for which the information in screen 300 is provided.

Figure 8:
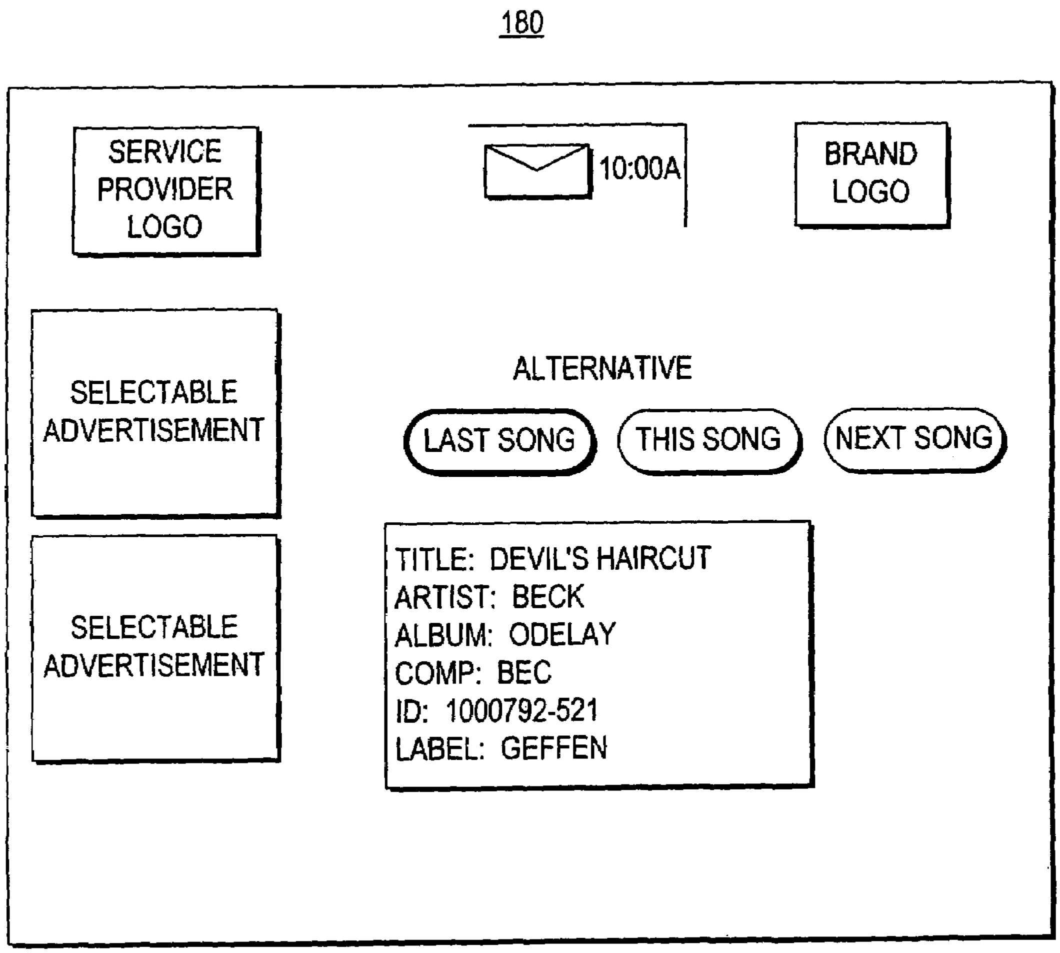
FIG. 8 shows an illustrative full music information screen that the music application may display when a user indicates a desire to view music information.

As shown in FIG. 8, the music application may display the music program's title, artist, album, composer, identifier, label, any other suitable related information (e.g., web links, related product information, etc.). The music application may also provide a user with the opportunity to view music information for previous and upcoming music programs played on the music channel if the information is available. The user may direct the music application to tune to the music program displayed in music information screen 300 by, for example, pressing an "OK" key on remote control 40.

Figure 9C:
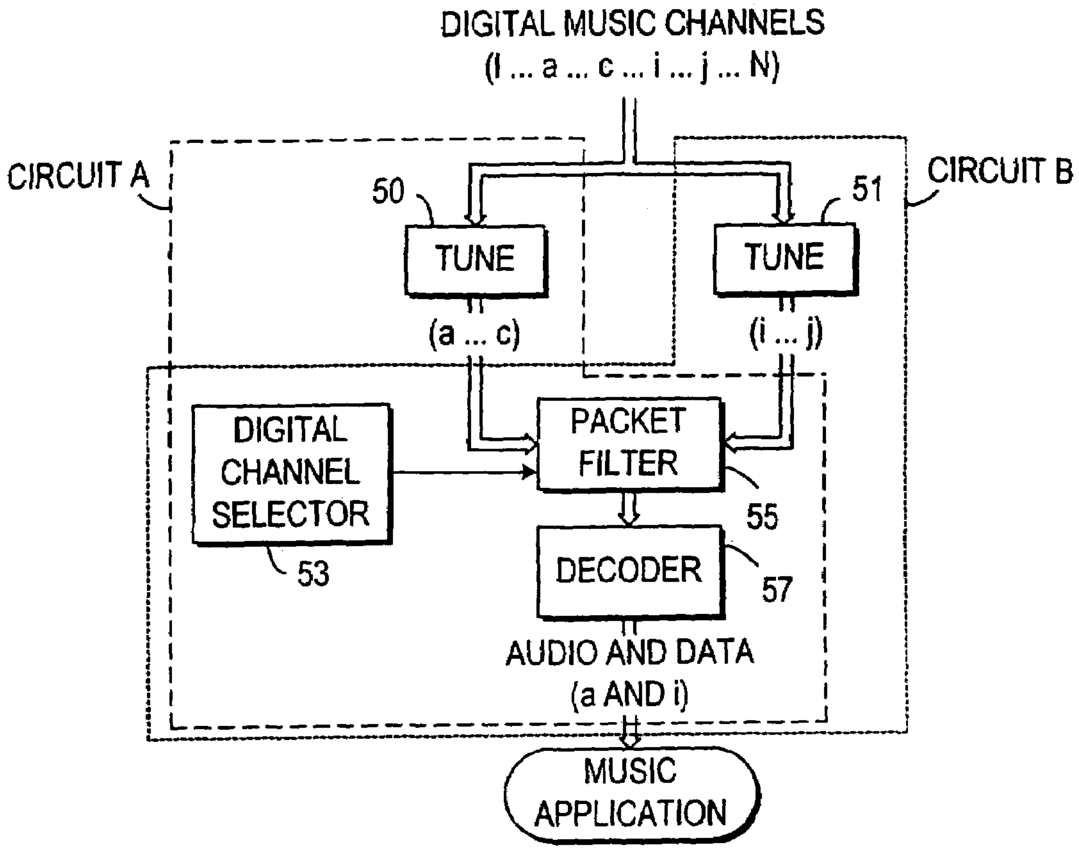

FIGS. 9*a*, 9*b*, and 9*c* show illustrative circuits that may be used to simultaneously obtain music program and music information from different music channels. As shown in the figures, components of the circuits may be shared to form separate logical circuits. For the purposes of FIGS. 9*a*, 9*b* and 9*c*, the term "circuit" refers to any physical or logical circuit.

FIG. 9*a* illustrates how the music application may obtain music information from one analog music channel while the user is listening to the music program of another analog channel tuned to by tuner 50 (CIRCUIT A). A number of analog music channels (e.g., 1 . . . N) are received by tuner 51. The music application directs tuner 51 to tune to a particular analog music channel (e.g., the next channel in a browse). This channel, channel X has its in-band music information extracted by extractor 52. Tuner 51 and extractor 52 are included in CIRCUIT B. The music information extracted by extractor 52 is displayed by the music application in, for example, a BROWSE display or music program listing screen.

FIG. 9*b* illustrates how the music application may obtain music programs and in-band music information from one digital channel or simultaneously from multiple digital channels that are carried at the same carrier frequency. FIG. 9*b* also illustrates how the same circuit components can be used to form one physical circuit yet two separate logical circuits, CIRCUIT A and CIRCUIT B. A tuner, in this example tuner 51, receives a number of digital music channels 1 (e.g., . . . i . . . j . . . N). The tuner is directed to tune to the carrier frequency of the desired channel or channels (e.g., the carrier frequency for digital music channels i . . . j). Digital channel selector 53 or the music application may load packet filter 55 with the PIDs of the desired digital channel or channels. Packet filter 55 filters out the unwanted packets, and the remaining packets are decoded by decoder 57. Audio and data for the desired music channels are played and displayed by the music application.

FIG. 9*c* illustrates how the music application simultaneously obtains music programs and in-band music information from multiple digital music channels that are carried at different carrier frequencies. Digital music channels (e.g., 1 . . . a . . . c . . . i . . . j . . . N) are received by tuners 50 and 51. Each tuner tunes to the carrier frequency of one of the two desired channels. Assume for purposes of illustration that digital channel “a” carries a music program that the user desires to hear, and that music channel “i” carries music information that the user wishes to view while listening to the music program on channel “a.”

Digital component selector 53 or the music application load the PIDs of channels “a” and “i” into packet filter 55. Unwanted audio and data packets are filtered out, and the audio and data packets for channels “a” and “i” are passed to decoder 57. The packets for each channel are decoded by decoder 57 and the audio (and data if desired) of channel “a” is played (or displayed) by the music application while the data for channel “i” is displayed by the music application.

The arrangement of FIG. 9*c* may be used, for example, to allow a user to hear the music program on one channel while viewing music information from another, such as when the user browses through music channels or when the user listens to a music channel while viewing a music program listings screen. CIRCUIT A, for example, may be used to obtain the music program from a first music channel, and CIRCUIT B may be used to obtain music information from a second music channel.

The music application may also provide the user with an opportunity to purchase music merchandise (e.g., an album, record, CD, concert tickets, etc.) or access other interactive features (e.g., see concert schedules, web browsing, etc.) that are associated with a music program. Merchandise that is associated with a music program may be identified, for example, by identifiers, graphics, or other information included in an in-band data stream on a music channel. The user may indicate a desire to purchase merchandise by, for example, pressing a “BUY” key on remote control 40 when tuned to a music channel, when browsing through music program listings, after highlighting a music program listing in a music program listings screen, or when in any other suitable music application display screen. The user may, for example, purchase merchandise that is related to the music program that the user is listening to or may purchase merchandise related to music programs that the user is viewing music information for. For example, the user may listen to one music program while ordering a CD for a music program on another music channel. There may also be a suitable menu option or other on-screen selectable option that the user can select. In response, the music application may generate a merchandise request.

A merchandise request includes information necessary for ordering the merchandise based on the type of ordering scheme used. The request may include, for example, a merchandise identifier, a user identifier or account number, or other suitable information. The request may be sent from the music application implemented on interactive music application equipment 17 to merchandising facility 10 over communications path 9 (FIG. 1).

Merchandising facility 10 may include any computer hardware or software suitable for receiving merchandise requests, ordering the merchandise, shipping the merchandise to the user, and billing the user. Merchandise requests can be provided to merchandising facility 10 using a number of approaches. In one approach for example, merchandising requests are transmitted from user music equipment 22 to distribution facility 16 over communications path 20 (FIGS. 2*a*–2*d*). Suitable hardware at distribution facility 16, such as music application server 25 (FIGS. 2*c* and 2*d*), may process the requests and pass them to merchandising facility 10 over communications path 9. The merchandising requests may include, for example, user information that merchandising facility 16 can use to generate an invoice for the merchandise. Alternatively, distribution facility 16 may bill the user for the merchandise on the user’s next statement and merchandising facility 10 may only ship the merchandise. In still another approach, user music equipment 22 may include communications hardware (e.g., a modem) and software suitable for transmitting merchandise requests to merchandising facility 10 over communications path 9.

Communications path 9 may be any communications path suitable for carrying merchandise requests from user music equipment 22 or distribution facility 16 to merchandising facility 10. Communications path 9 may include, for example, a satellite link, a telephone network link, a cable or fiber optic link, a microwave link, an Internet link, a combination of such links, or any other suitable communications link.

If desired, the music application may use tuner 51 to retrieve in-band music information from one channel while tuned to another. For example, the music application may provide a program carried on one channel for a user while providing the user with the opportunity to view in-band program information for a program on a different channel using a browse feature. As the user browses through each different channel, the music application may direct tuner 51 to tune to that channel and the music application may obtain data from that channel.

Figure 10:
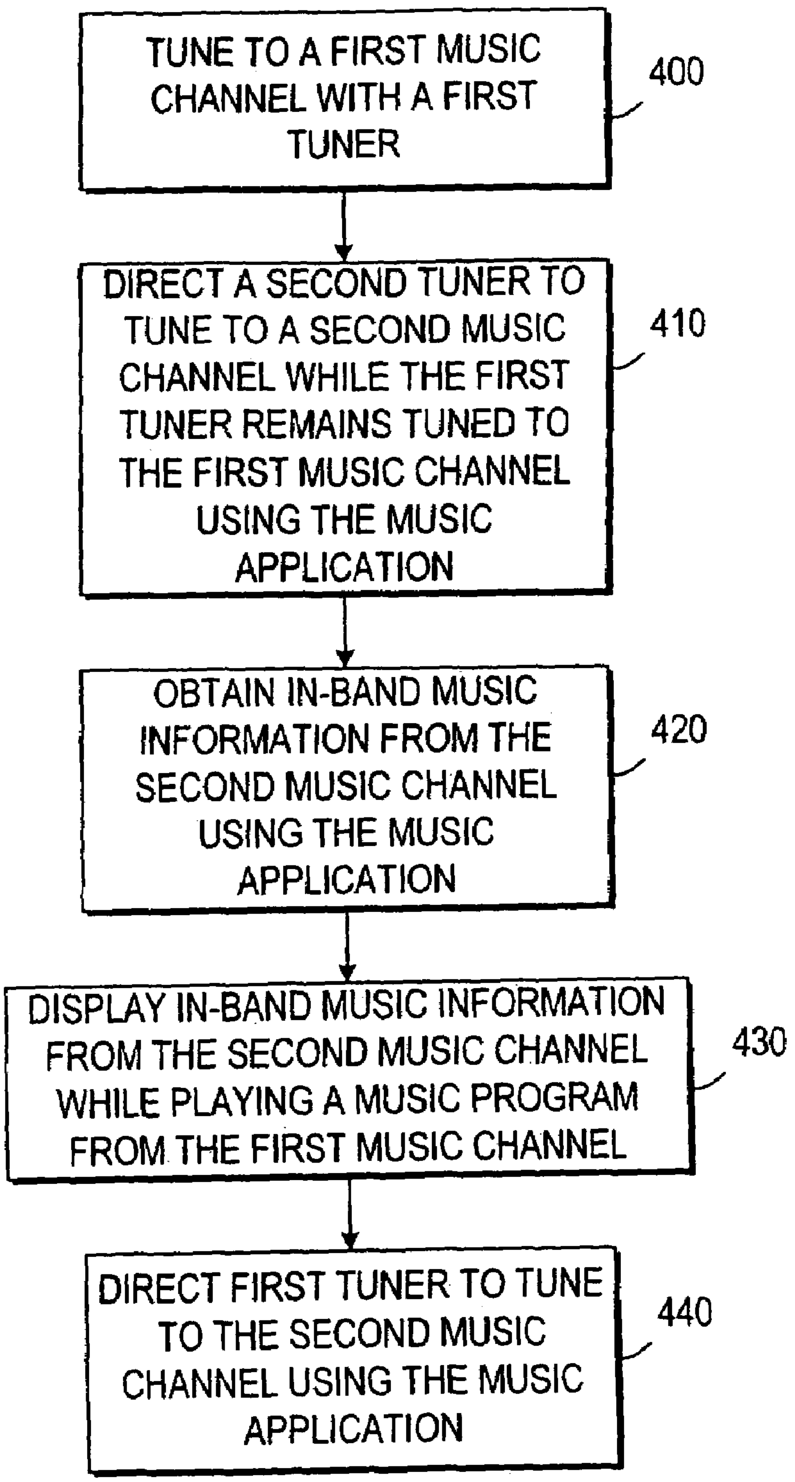
FIG. 10 is a flowchart of illustrative steps involved in providing a user with an opportunity to listen to a music program carried on one channel while viewing in-band music information for a music program carried on another.
Figure 11:
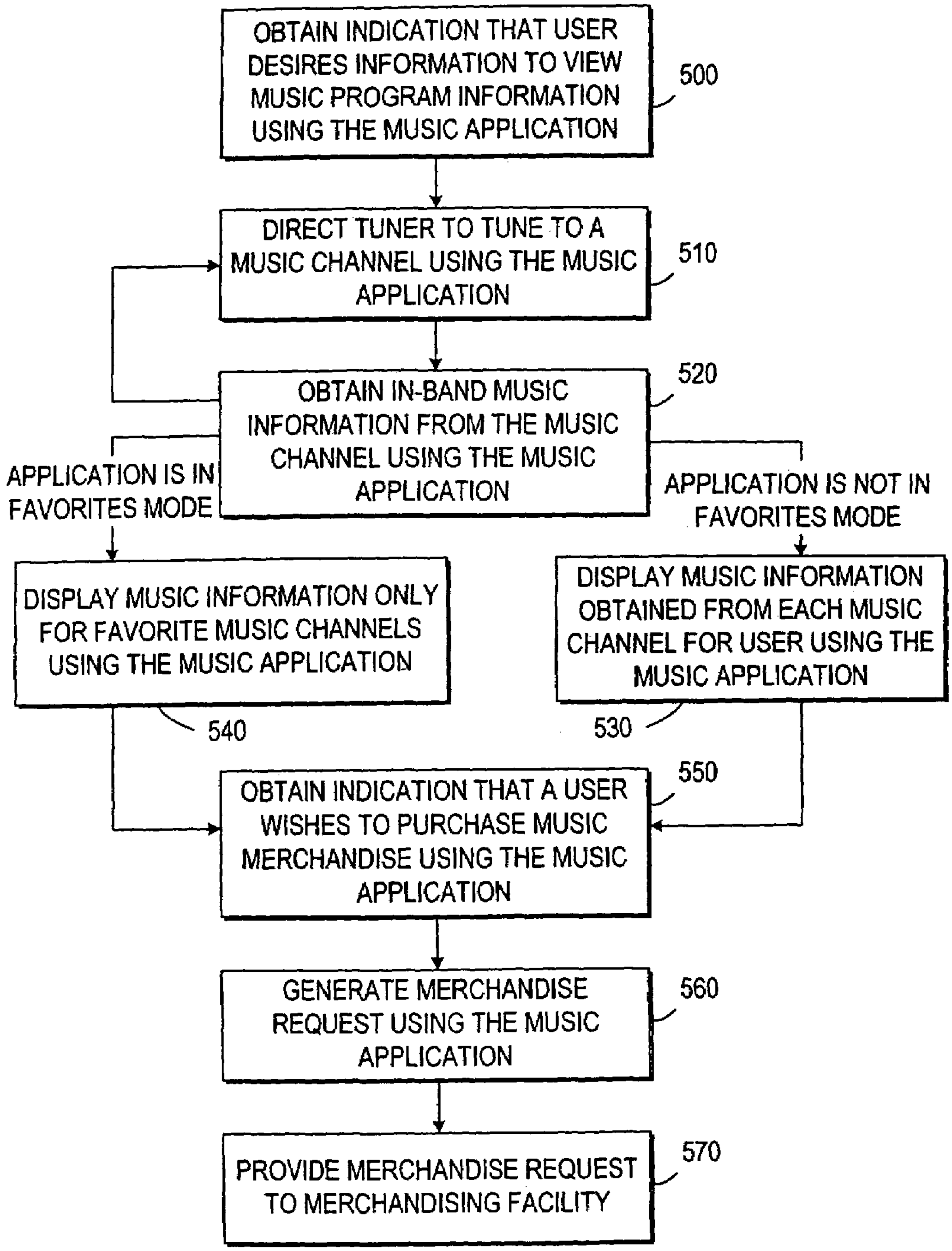
FIG. 11 is an illustrative flowchart of steps involved in providing a user with access to music information and other features of the music application.
Figure 12:
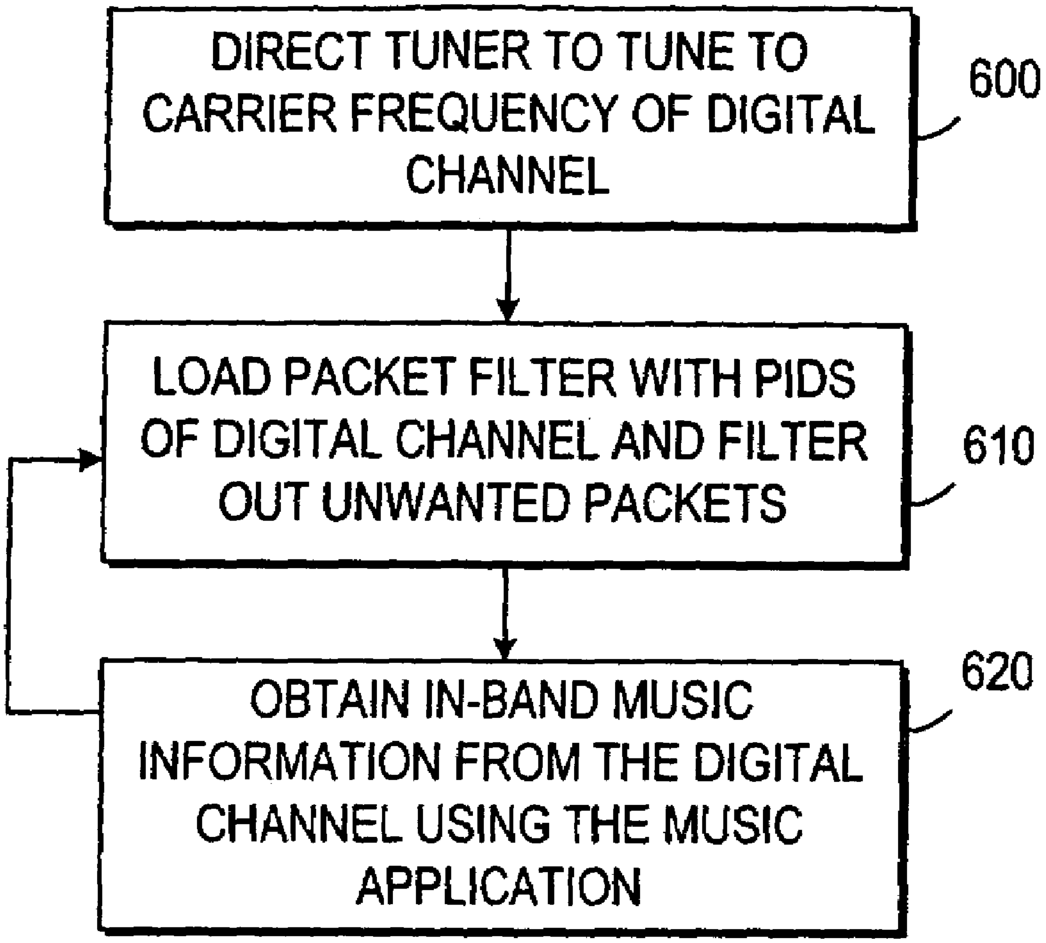
FIG. 12 is an illustrative flowchart of steps involved in obtaining in-band music information from a digital music channel.

FIGS. 10–12 are flowcharts of illustrative steps involved in the operation of the music application of the present invention. The steps shown in FIGS. 10–12 are illustrative and may be performed in any suitable order. If desired, some of the steps may be combined or omitted.

FIG. 10 is a flowchart of illustrative steps involved in allowing a user to listen to a music program carried on one channel while viewing in-band music information for a music program carried on another channel. At step 400, a first tuner, tuner 50, tunes to a first music channel. This may occur, for example, in response to the user flipping or tuning directly to an analog or digital music channel. At step 410, a second tuner, tuner 51, is directed to tune to a second music channel by the music application. Step 410 may occur, for example, in response to the user indicating a desire to browse through music channels while remaining tuned to a particular music channel, or in response to the user indicating a desire to view or navigate through listings of music information displayed in a music program listings screen.

At step 420, the interactive music application obtains in-band music information from the second music channel with the second tuner and decoder 57. The in-band music information from the second music channel may, for example, be from a dedicated music channel (i.e., a channel that carries only music information) or from a music channel on which music programs are carried. At step 430, the music application displays the in-band music information obtained from the second music channel while playing the music program from the first music channel. This may occur, for example, when the user browses through music channels, when the user navigates through a music program listings screen, when the user selects a music listing in a music listings screen, or in response to any other suitable event. If music information for all channels is carried on the first music channel, steps 410 through 430 may be skipped.

The music application may direct the first tuner, tuner 50, to tune to the second music channel at step 440. This step may occur, for example, when the user selects a music channel from within a BROWSE display, full music information screen, or music program listings screen (e.g., by highlighting that channel and pressing "OK").

FIG. 11 is flowchart of illustrative steps involved in providing a user with access to music information and other features of the music application. At step 500, the music application obtains an indication that the user desires to view music program information. This step may be performed when, for example, the user indicates a desire to browse through music program listings, to view a music program listings screen, or to view a full music information screen. At step 510, the music application directs a tuner to tune to the appropriate analog or digital music channel with which the music program information is associated. At step 520, the music application obtains in-band music information from the music channel. Steps 510 and 520 may be repeated multiple times as needed. For example, the music application may repeat steps 510 and 520 when the user browses through multiple music channels or when the music application is obtaining music information from a number of channels in order to display a music program listings screen. If steps 510 and 520 are repeated, the music application may store the obtained music information in memory.

At step 530, the music application displays the in-band music information obtained from each music channel. If in favorites mode, the music application displays music information only for those music channels that have been designated as favorites (step 540). If in favorites mode, the application may only retrieve information for favorite channels. This may allow the music application to perform steps 510 and 520 less frequently for channels not of interest and more frequently for each channel of interest.

At step 550, the music application may obtain an indication that a user wishes to purchase music merchandise. This may occur, for example, in response to a user entering an appropriate command (e.g., pressing a "BUY" button on remote control 40) when tuned to a music channel, when browsing through listings, when in a full music information screen, after highlighting a music listing in a music listings screen, or after any other suitable event. In response, the music application generates a merchandise request (step 560). At step 570, the merchandise request is provided to merchandising facility 10 via communications path 9 (FIG. 1). The merchandise request may be provided to merchandising facility 10 either directly from user music equipment 22 or from distribution facility 16.

FIG. 12 is an illustrative flowchart of steps involved in obtaining in-band music information from a digital music channel, such as may be performed at step 420 of FIG. 10 and step 520 of FIG. 10. At step 600, tuner 50 or tuner 51 is directed to the analog carrier of tune to a digital music channel. This may occur automatically when, for example, a user changes channels. The music application may also direct tuner 50 or tuner 51 to tune to a particular carrier of digital music channel when the music application requires information for a music program listings screen or the like. At step 610, packet filter 55 (FIGS. 3 and 4) is provided with the PIDs of the digital channel from which data is required. The PIDs may be provided to the packet filter by digital channel selector 53 or the interactive music application. At step 620, the music application obtains in-band music information from the digital channel. Steps 610 and 620 may be repeated when, for example, the music application obtains in-band music information from a number of digital channels at the same carrier frequency (e.g., as when the user browses through music channels or when the music application displays a music program listings screen).

The foregoing is merely illustrative of the principles of this invention and various modifications can be made by those skilled in the art without departing from the scope and spirit of the invention.

What is claimed is:

1. A music distribution system in which music is distributed over a plurality of music channels to a number of users for playing by their user music equipment, wherein each music channel has an associated data stream comprising information on a plurality of music programs, the system comprising:

a circuit in the user music equipment for obtaining a first music program carried on a first of the plurality of music channels and for obtaining the music information on a second music program from the data stream associated with the first music channel while the first music program is being played by the user music equipment, wherein the second music program was broadcast in the past or is to be broadcast in the future; and an interactive music application implemented at least in part on the user music equipment, wherein:

the circuit is directed by the interactive music application to obtain the music information on the second music program; and the music information on the second music program is displayed by the user music equipment using the interactive music application while the first music program is being played by the user music equipment.

2. The system defined in claim 1 wherein the music information on the second music program is displayed in a browse display by the user music equipment using the interactive music application while the first music program is being played by the user music equipment.

3. The system defined in claim 1 wherein the music information on the second music program is displayed in a music program listings screen by the user music equipment using the interactive music application while the first music program is being played by the user music equipment.

4. The system defined in claim 1 wherein the music information on the second music program is displayed in a full music information screen by the user music equipment using the interactive music application while the first music program is being played by the user music equipment.

5. A music distribution system in which music is distributed over a plurality of music channels to a number of users for playing by their user music equipment, wherein each music channel has an associated data stream comprising information on a plurality of music programs, the system comprising:

means for obtaining a first music program carried on a first of the plurality of music channels and for obtaining the music information on a second music program from the data stream associated with the first music channel while the first music program is being played by the user music equipment, wherein the second music program was broadcast in the past or is to be broadcast in the future;

means using an interactive music application implemented at least in part on the user music equipment for directing the means for obtaining to obtain the music information on the second music program; and means for displaying the music information on the second music program using the interactive music application while the first music program is being played by the user music equipment.

6. The system defined in claim 5 wherein the means for displaying the music information on the second music program comprises means for displaying the music information and the second music program in a browse display using the interactive music application while the first music program is being played by the user music equipment.

7. The system defined in claim 5 wherein the means for displaying the music information on the second music program comprises means for displaying the music information and the second music program in a music program listings screen using the interactive music application while the first music program is being played by the user music equipment.

8. The system defined in claim 5 wherein the means for displaying the music information on the second music program comprises means for displaying the music information and the second music program in a full music information screen using the interactive music application while the first music program is being played by the user music equipment.

9. A method in a music distribution system in which music is distributed over a plurality of music channels to a number of users for playing by their user music equipment, wherein each music channel has an associated data stream comprising information on a plurality of music programs, the method comprising the steps of:

obtaining a first music program carried on a first of the plurality of music channels and for obtaining the music information on a second music program from the data stream associated with the first music channel while the first music program is being played by the user music equipment, wherein the second music program was broadcast in the past or is to be broadcast in the future;

using an interactive music application implemented at least in part on the user music equipment to direct the obtaining of the music information on the second music program; and displaying the music information on the second music program using the interactive music application while the first music program is being played by the user music equipment.

10. The method defined in claim 9 wherein displaying the music information on the second music program comprises displaying the music information and the second music program in a browse display using the interactive music application while the first music program is being played by the user music equipment.

11. The method defined in claim 9 wherein displaying the music information on the second music program comprises displaying the music information and the second music program in a music program listings screen using the interactive music application while the first music program is being played by the user music equipment.

12. The method defined in claim 9 wherein displaying the music information on the second music program comprises displaying the music information and the second music program in a full music information screen using the interactive music application while the first music program is being played by the user music equipment.

* * * * *

UNITED STATES PATENT AND TRADEMARK OFFICE

CERTIFICATE OF CORRECTION

PATENT NO. : 7,231,175 B2
APPLICATION NO. : 11/032733
DATED : June 12, 2007
INVENTOR(S) : Michael D. Ellis It is certified that error appears in the above-identified patent and that said Letters Patent is hereby corrected as shown below:

On the Title page
Item (56), in "4,488,179 A ...," change Krü ger et al." to -- "Krüger et al." --.

SPECIFICATION
Column 6, line 49, change "communicate path" to -- "communications paths" --.
Column 10, line 5, change "FIG. 5b." to -- "FIG. 5b," --.
Column 13, line 13, change "tune the music" to -- "tune to the music" --.
Column 14, line 51, change "this channel, channel X has its" to -- "this channel, channel X, has its" --.
Column 16, line 4, change "In one approach for example" to -- "In one approach, for example" --.
Column 17, line 58, change "step 520 of FIG.10" to -- "step 520 of FIG. 11" --.
Column 17, line 59, change "to the analog carrier of tune to" to -- "to tune to the analog carrier of" --.
Column 17, line 62, change "particular carrier of" to -- "particular carrier of a" --.

Signed and Sealed this

Eighth Day of January, 2008

JON W. DUDAS
*Director of the United States Patent and Trademark Office*